United States Patent
Kim et al.

(10) Patent No.: US 12,477,415 B2
(45) Date of Patent: Nov. 18, 2025

(54) METHOD AND DEVICE FOR SUPPORTING NETWORK OPTIMIZATION IN NEXT-GENERATION MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 18/019,172

(22) PCT Filed: Sep. 13, 2021

(86) PCT No.: PCT/KR2021/012434
§ 371 (c)(1),
(2) Date: Feb. 1, 2023

(87) PCT Pub. No.: WO2022/065775
PCT Pub. Date: Mar. 31, 2022

(65) Prior Publication Data
US 2023/0413135 A1      Dec. 21, 2023

(30) Foreign Application Priority Data

Sep. 24, 2020   (KR) ................... 10-2020-0123762

(51) Int. Cl.
*H04W 36/36* (2009.01)
*H04W 36/00* (2009.01)
*H04W 36/30* (2009.01)

(52) U.S. Cl.
CPC ..... *H04W 36/0079* (2018.08); *H04W 36/302* (2023.05); *H04W 36/305* (2018.08); *H04W 36/362* (2023.05)

(58) Field of Classification Search
None
See application file for complete search history.

(56) References Cited

U.S. PATENT DOCUMENTS

| 2019/0223073 A1 | 7/2019 | Chen et al. |
| 2020/0077314 A1 | 3/2020 | Hwang et al. |

(Continued)

FOREIGN PATENT DOCUMENTS

| CN | 110351790 A | 10/2019 |
| CN | 113396635 A | 9/2021 |

(Continued)

OTHER PUBLICATIONS

Lenovo et al.; RLF report for CHO MRO; 3GPP TSG-RAN WG3 Meeting #109e, Aug. 17-28, 2020, Online; R3-204918; Aug. 7, 2020.

(Continued)

*Primary Examiner* — Robert M Morlan
(74) *Attorney, Agent, or Firm* — Jefferson IP Law, LLP

(57) ABSTRACT

The present disclosure relates to a communication technique that merges IoT technology with a 5G communication system for supporting higher data transmission rates than 4G systems, and a system for same. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. The present invention provides a method and device for implementing a (Continued)

handover operation and composing wireless connection failure information accompanying same.

12 Claims, 18 Drawing Sheets

(56) References Cited

U.S. PATENT DOCUMENTS

| | | |
|---|---|---|
| 2020/0413279 A1 | 12/2020 | Kim et al. |
| 2021/0099926 A1* | 4/2021 | Chen .................. H04W 36/362 |
| 2022/0030485 A1 | 1/2022 | Kim |
| 2022/0141735 A1 | 5/2022 | Liu et al. |
| 2023/0040285 A1* | 2/2023 | Parichehrehteroujeni .................. H04W 36/362 |

FOREIGN PATENT DOCUMENTS

| | | |
|---|---|---|
| KR | 10-2018-0122963 A | 11/2018 |
| KR | 10-2020-0102497 A | 8/2020 |
| WO | 2019/192150 A1 | 10/2019 |
| WO | 2019/221436 A1 | 11/2019 |
| WO | 2020/116938 A1 | 6/2020 |

OTHER PUBLICATIONS

Huawei et al.; Discussion for RAN2 SON scope and requirements; 3GPP TSG-RAN WG2 Meeting #111 electronic, Aug. 17-28, 2020, Online; R2-2007769; Aug. 7, 2020.
NEC; SON for Rel-16 mobility enhancement; 3GPP TSG-RAN WG2 #111 electronic, Aug. 17-28, 2020, E-Meeting; R2-2007196; Aug. 7, 2020.
CMCC; New WID on enhancement of data collection for SON/MDT in NR; 3GPP TSG RAN Meeting #86, Dec. 9-12, 2019, Sitges, Barcelona; RP-193255; Dec. 12, 2019.
Ericsson; Open issues UE capability, DCP, UE assistance and RRM relaxation; 3GPP TSG-RAN2 Meeting #109bis-e, Online; R2-2003288; Apr. 10, 2020.
Nokia et al.; On RLF reporting for CHO and DAPS; 3GPP TSG-RAN WG2 Meeting #108; R2-1915497; Reno, USA; Nov. 18-22, 2019; Nov. 7, 2019.
Lenovo et al.; MRO for CHO and DAPS Handover; 3GPP TSG-RAN WG2 Meeting #111e; R2-2007465; Online; Aug. 17-28, 2020; Aug. 7, 2020.
Extended European Search Report dated Dec. 15, 2023; European Appln. No. 21872804.6-1216 / 4181570 PCT/KR2021012434.
Chinese Office Action dated Jul. 9, 2025, issued in Chinese Patent Application No. 202180065126.5.

* cited by examiner

METHOD AND DEVICE FOR SUPPORTING NETWORK OPTIMIZATION IN NEXT-GENERATION MOBILE COMMUNICATION SYSTEM

TECHNICAL FIELD

The disclosure relates to a method and a device for constituting a handover operation and consequent wireless connection failure information.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE system". Implementation of the 5G communication system in ultrahigh frequency (mmWave) bands, e.g., 60 GHz bands, is being considered in order to accomplish high data transmission rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) network where distributed entities, such as things, exchange and process information. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

Meanwhile, unlike a general handover, a condition-based handover operation is so featured that in case that a UE receives configuration information indicating performing of a handover from a base station, the UE does not immediately perform a handover operation, but performs the handover operation when a predetermined condition is satisfied. In this case, since the UE can grasp a change of a channel quality state most quickly, it may be advantageous to minimization of a handover failure probability that the UE determines a starting time point of the handover operation.

DISCLOSURE OF INVENTION

Technical Problem

In case that a condition-based handover is continuously performed, and a radio link failure (RLF) continuously occurs, an RLF report stored when the first RLF occurs may be deleted based on a subsequent RLF occurrence, and thus a problem may occur, in which a mobile communication service provider is unable to perceive the first RLF situation accurately.

One aspect of the disclosure is to provide a method for configuring a plurality of RLF reports in case that a continuous RLF occurs in a condition-based handover process.

Solution to Problem

According to an embodiment of the disclosure to solve the above problems, a method performed by a terminal in a wireless communication system may include: identifying that a condition-based handover is supported by the terminal; receiving, from a base station, configuration information on the condition-based handover; performing a handover to a first cell, in case that a predetermined condition is identified to be satisfied based on the configuration information; performing a cell selection operation, in case that the handover to the first cell is failed; performing the handover to a second cell, in case that the second cell is selected based on the cell selection operation; and transmitting, to the base station, a radio link failure (RLF) report based on a radio resource control (RRC) connection establishment with the base station, in case that the handover to the second cell is failed, wherein the RLF report includes first RLF information associated with a failure of the handover to the first cell and second RLF information associated with a failure of the handover to the second cell.

Further, according to an embodiment of the disclosure, a method performed by a base station in a wireless communication system may include: receiving, from a terminal, capability information indicating support of a condition-based handover; determining to trigger the condition-based handover for the terminal based on the capability information; transmitting, to the terminal, configuration information on the condition-based handover; and receiving, from the terminal, a radio link failure (RLF) report based on the configuration information, in case that a radio resource control (RRC) connection is established with the terminal, wherein the RLF report includes first RLF information associated with a failure of a handover to a first cell and second RLF information associated with a failure of a handover to a second cell.

Further, according to an embodiment of the disclosure, a terminal in a wireless communication system may include: a transceiver; and a controller configured to: identify that a condition-based handover is supported by the terminal, control the transceiver to receive, from a base station, configuration information on the condition-based handover, perform a handover to a first cell, in case that a predetermined condition is identified to be satisfied based on the configuration information, perform a cell selection operation, in case that the handover to the first cell is failed, perform the handover to a second cell in case that the second cell is selected based on the cell selection operation, and control the transceiver to transmit, to the base station, a radio link failure (RLF) report based on a radio resource control (RRC) connection establishment with the base station, in case that the handover to the second cell is failed, wherein the RLF report includes first RLF information associated with a failure of the handover to the first cell and second RLF information associated with a failure of the handover to the second cell.

Further, according to an embodiment of the disclosure, a base station in a wireless communication system may include: a transceiver; and a controller configured to: control the transceiver to receive, from a terminal, capability information indicating support of a condition-based handover, determine to trigger the condition-based handover for the terminal based on the capability information, control the transceiver to transmit, to the terminal, configuration information on the condition-based handover, and control the transceiver to receive, from the terminal, a radio link failure (RLF) report based on the configuration information, in case that a radio resource control (RRC) connection is established with the terminal, wherein the RLF report includes first RLF information associated with a failure of a handover to a first cell and second RLF information associated with a failure of a handover to a second cell.

Advantageous Effects of Invention

According to an embodiment of the disclosure, it is possible for a mobile communication service provider to accurately grasp information on all RLF situations even if a continuous RLF occurs in a condition-based handover process.

MODE FOR THE INVENTION

Hereinafter, the principle of operation of the disclosure will be described in detail with reference to the accompanying drawings. In describing the disclosure, a detailed description of related known functions or constitutions will be omitted if it is determined that it obscures the gist of the disclosure unnecessarily. Further, terms to be described later are terms defined in consideration of their functions in the disclosure, and may differ depending on intentions of a user or an operator, or customs. Accordingly, they should be defined based on the contents of the whole description of the disclosure.

In describing the disclosure hereinafter, detailed explanation of related known functions or configurations will be omitted if it is determined that it obscures the gist of the disclosure unnecessarily. Hereinafter, embodiments of the disclosure will be described with reference to the accompanying drawings.

In describing the disclosure hereinafter, detailed explanation of related known functions or configurations will be omitted if it is determined that it obscures the gist of the disclosure unnecessarily. Hereinafter, embodiments of the disclosure will be described with reference to the accompanying drawings.

Figure 1:
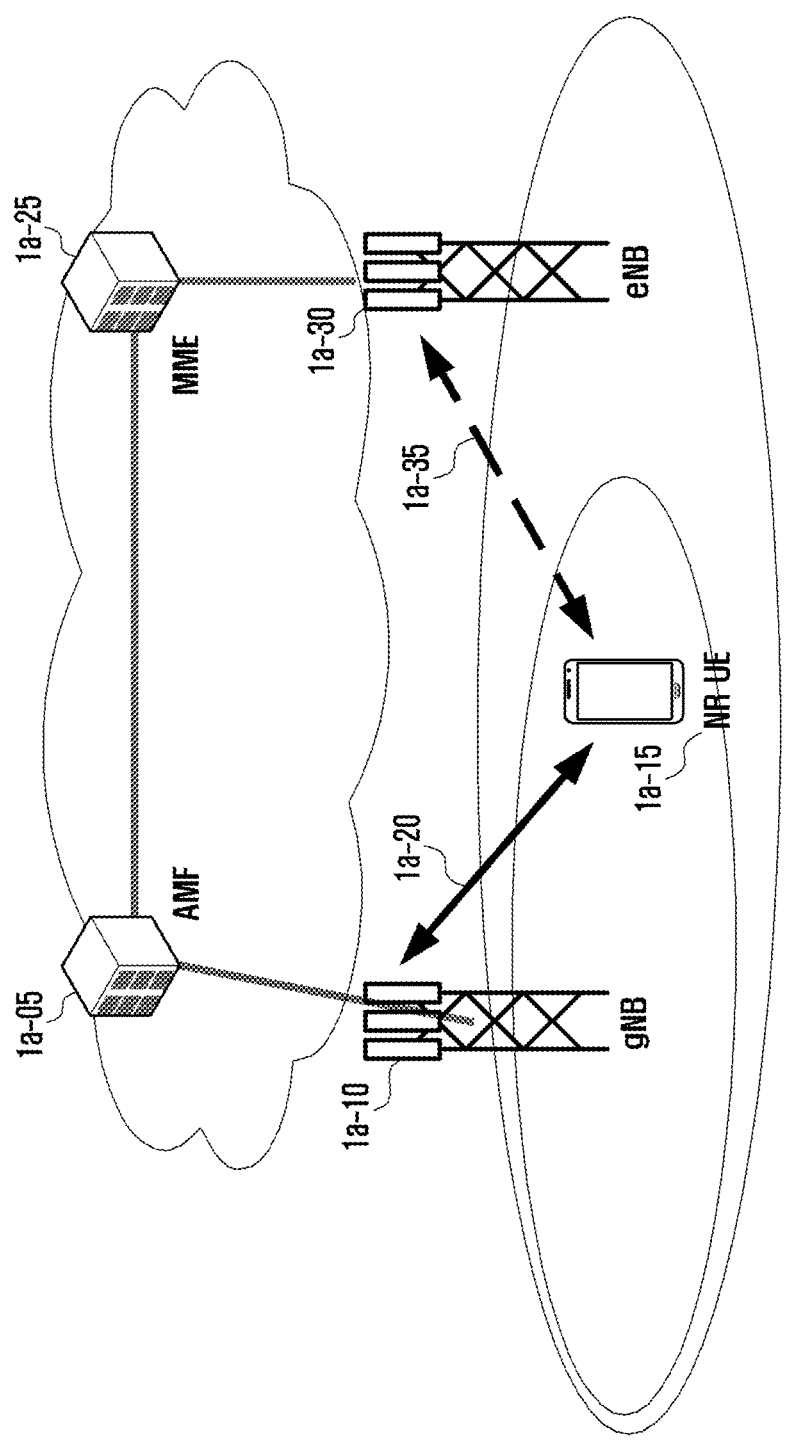
FIG. 1 is a diagram illustrating the structure of a next generation mobile communication system according to an embodiment of the disclosure.

FIG. 1 is a diagram illustrating the structure of a next generation mobile communication system.

Referring to FIG. 1, as illustrated, a radio access network of a next generation mobile communication system (new radio (NR)) is composed of a new radio node B (hereinafter, gNB) 1a-10 and a new radio core network (AMF) 1a-05. A new radio user equipment (hereinafter, NR UE or terminal) 1a-15 accesses an external network through the gNB 1a-10 and the AMF 1a-05.

In FIG. 1, the gNB corresponds to an evolved node B (eNB) of the existing LTE system. The gNB is connected to the NR UE on a radio channel, and thus it can provide a more superior service than the service of the existing node B (1a-20). Because all user traffics are serviced on shared channels in the next generation mobile communication system, a device, which performs scheduling through consolidation of status information, such as a buffer state, an available transmission power state, and a channel state of each UE, is necessary, and the gNB 1a-10 takes charge of this. One gNB generally controls a plurality of cells. In order to implement ultrahigh-speed data transmission as compared with the existing LTE, the gNB may have the existing maximum bandwidth or more, and a beamforming technology may be additionally grafted in consideration of the orthogonal frequency division multiplexing (hereinafter, referred to as "OFDM") as a radio access technology. Further, an adaptive modulation & coding (hereinafter, referred to as "AMC") scheme determining a modulation scheme and a channel coding rate is applied to match the channel state of the UE.

The AMF 1a-05 performs functions of mobility support, bearer configuration, and QoS configuration. The AMF is a device taking charge of not only UE mobility management but also various kinds of control functions, and is connected to a plurality of base stations. Further, the next generation mobile communication system may interlock with the existing LTE system, and the AMF is connected to an MME 1a-25 through a network interface. The MME is connected to an eNB 1a-30 that is the existing base station. The UE supporting an LTE-NR dual connectivity may transmit and receive data to and from not only the gNB but also the eNB while maintaining connections thereto (1a-35).

Figure 2:
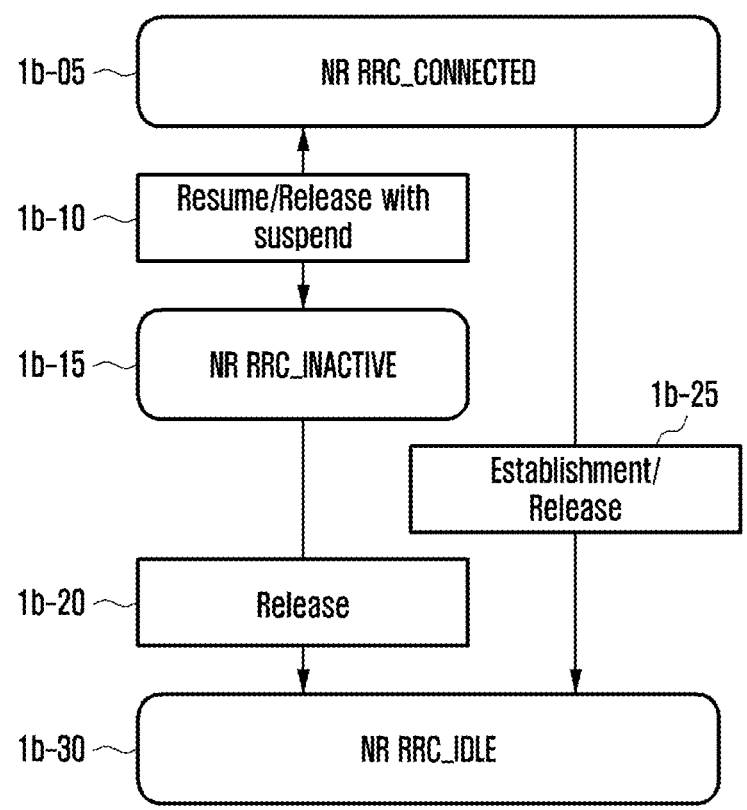
FIG. 2 is a diagram explaining a radio access state transition in a next generation mobile communication system according to an embodiment of the disclosure.

FIG. 2 is a diagram illustrating a radio access state transition in a next generation mobile communication system.

The next generation mobile communication system has three kinds of radio resource control (RRC) states. A connected mode (RRC_CONNECTED) 1b-05 corresponds to a radio access state where a UE can perform data transmission/reception. An idle mode (RRC_IDLE) 1b-30 corresponds to a radio access state where the UE monitors whether paging is transmitted to itself. The above two modes correspond to the radio access states being applied even to the existing LTE system, and the detailed technology thereof is the same as that of the existing LTE system. In the next generation mobile communication system, an inactive (RRC_INACTIVE) radio access state 1b-15 has been newly defined. In the RRC_INACTIVE radio access state, UE context is maintained in the base station and the UE, and radio access network (RAN)-based paging is supported. The features of the new radio access state are arranged as follows.

Cell re-selection mobility;

CN-NR RAN connection (both C/U-planes) has been established for UE;

The UE AS context is stored in at least one gNB and the UE;

Paging is initiated by NR RAN;

RAN-based notification area is managed by NR RAN;

NR RAN knows the RAN-based notification area which the UE belongs to;

The new RRC_INACTIVE radio access state may be transitioned to a connected mode or the idle mode by using a specific procedure. In accordance with a resume process, the mode is switched from the RRC_INACTIVE mode to the connected mode, and the mode is switched from the connected mode to the RRC_INACTIVE mode by using a release procedure including suspend configuration information (1b-10). In the above procedure, one or more RRC messages are transmitted and received between the UE and the base station, and the procedure is composed of one or more operations. Further, the mode can be switched from the RRC_INACTIVE mode to the idle mode through a release procedure after the resume process (1b-20). The switching between the connected mode and the idle mode follows the existing LTE technology. That is, the mode switching is performed through an establishment or release procedure (1b-25).

Figure 3:
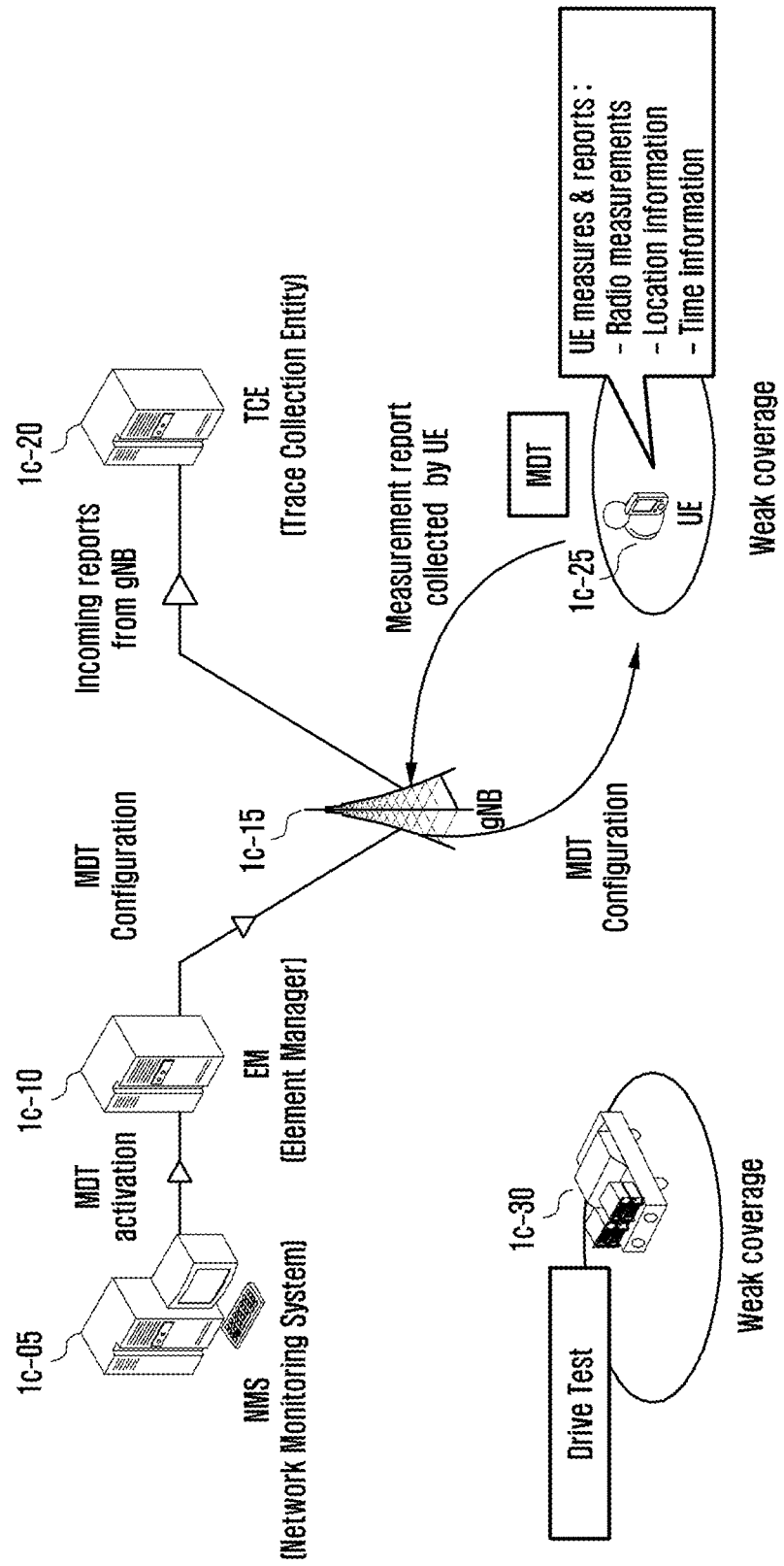
FIG. 3 is a diagram explaining a technology to collect and report cell measurement information according to an embodiment of the disclosure.

FIG. 3 is a diagram explaining a technology to collect and report cell measurement information in the disclosure.

During network establishment or optimization, a mobile communication service provider typically goes through processes of measuring signal strength in an expected service area, and based on this, disposing or readjusting base stations in the service area. The service provider loads signal measurement equipment in a vehicle, and collects cell measurement information in the service area, so that a lot of time and money is required. In general, the above process is performed by utilizing the vehicle, and is commonly called drive test.

The UE is mounted with a function capable of measuring a signal to the base station in order to support operations of cell reselection or handover, or serving cell addition during movement between cells. Accordingly, instead of the drive test, the UE in the service area may be utilized, and this is called minimization of drive test (MDT). The service provider may configure an MDT operation with respect to specific UEs through several configuration devices of the network, and the UEs collect and store signal strength information from a serving cell and peripheral cells in the connected mode (RRC_Connected), the idle mode (RRC_Idle), or the inactive mode (RRC_Inactive). In addition, the UEs also store various pieces of information, such as location information, time information, and signal quality information. The information stored as above may be reported to a network when the UEs are in the connected mode, and the information is transferred to a specific server.

The MDT operation may be briefly classified into an immediate MDT and a logged MDT.

The immediate MDT is featured to immediately report the collected information to the network. Since the report should be immediately performed, only a connected mode UE can perform this. Typically, an RRM measurement process for supporting the operations of handover and serving cell addition is reused, and location information and time information are additionally reported.

The logged MDT is featured to store the collected information without immediate report to the network, and to report the stored information after the UE is switched to the connected mode thereafter. In general, the UE in the idle mode, which is unable to report immediately to the network, performs this. The UE in the inactive mode, which is introduced in the next generation mobile communication system, performs the logged MDT. When a specific UE is in the connected mode, the network provides configuration information for performing the logged MDT operation to the UE, and the UE collects and stores the configured information after being switched to the idle mode or the inactive mode.

| | RRC state |
|---|---|
| Immediate MDT | RRC_Connected |
| Logged MDT | RRC_Idle, RRC_Inactive |

Figure 4:
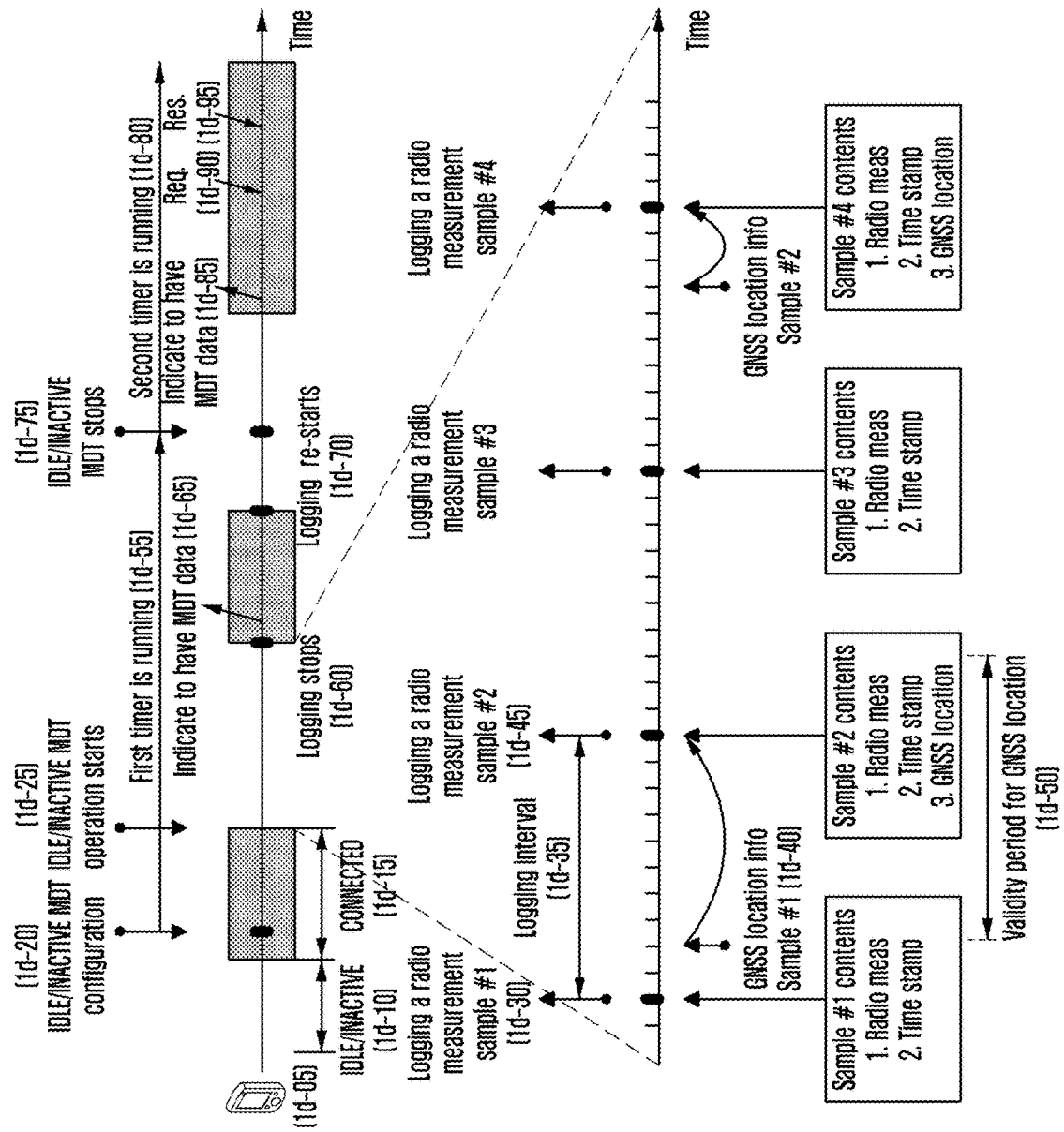
FIG. 4 is a diagram illustrating a method for collecting and reporting cell measurement information according to an embodiment of the disclosure.

FIG. 4 is a diagram illustrating a method for collecting and reporting cell measurement information in the disclosure.

A UE 1d-05 is switched from the idle mode or the inactive mode 1d-10 to the connected mode 1d-15. In the connected mode, the UE collects MDT data through an immediate MDT operation, and reports the collected MDT data to a base station. The UE having been switched to the connected mode is provided with logged MDT configuration information that is performed in the idle mode or the inactive mode from the base station (1d-20). The configuration information is included in a specific RRC message to be transmitted to the UE, and the UE having received the message drives a first timer (1d-55). The UE performs the logged MDT operation in the idle mode or the inactive mode section until the first timer expires.

The value of the first timer is included in the logged MDT configuration information. If the UE is switched to the idle mode or the inactive mode, the UE performs the logged MDT in accordance with the received configuration information (1d-25). The UE stores specific information collected every configured period and logging interval 1d-35 (1d-30 and 1d-45). Further, if effective location information 1d-40 is collected, the UE should also store the same information. It is determined that the location information is effective if a specific time 1d-50 does not elapse after the information is collected. The specific time is shorter than or equal to the logged interval.

Even if the first timer has not yet expired, the UE suspends the logged MDT operation having been performed when the UE is switched to the connected mode (1d-60). However, the first timer is continuously driven without being suspended even in the connected mode section. That is, the first timer is continuously driven regardless of the change of the RRC state. However, in case that the MDT data is unable to be stored any more due to the insufficient UE memory for storing the MDT data, or the logged MDT configuration information is released, the first timer is stopped. A case that the logged MDT configuration information is released is a case that another logged MDT configuration information is provided from a serving RAT or another RAT, or a case that the UE is detached or power is cut off. In the RRC connection establishment or RRC connection resume process, the UE reports, to the base station, that the UE has the collected information (MDT data) that is stored by the UE itself by using an RRC setup complete message or an RRC resume complete message (1d-65).

The connection establishment process is a process in which the UE is switched from the idle mode to the connected mode. Typically, this process is composed of three operations, and three kinds of RRC messages are used.

Step 1: The UE transmits an RRC setup request message to the base station.
Step 2: The base station transmits an RRC setup message to the UE.
Step 3: The UE transmits an RRC setup complete message to the base station.

The connection resume process is a process in which the UE is switched from the inactive mode to the connected mode. Typically, this process is composed of three operations, and three kinds of RRC messages are used.

Step 1: The UE transmits an RRC resume request message to the base station.
Step 2: The base station transmits an RRC resume message to the UE.
Step 3: The UE transmits an RRC resume complete message to the base station.

The UE reports information indicating that the UE has the collected information to a target base station even in an RRC connection reestablishment and handover process in addition to the connection establishment or connection resume process. In case that the logged MDT has been established, but there is no information collected and stored, the UE omits the report. If necessary, the base station having received the report may request the UE to report the MDT data stored in the UE. The UE should continuously store the MDT data having not been reported for a specific time.

In case that the UE is switched again to the idle mode or the inactive mode, and the first timer has not yet expired, the logged MDT operation is resumed (1d-70). If the first timer has expired, the logged MDT operation is stopped (1d-75). The UE having stopped the above operation drives a second timer (1d-80), and maintains the stored MDT data until the timer expires. After the timer has expired, whether to delete the stored MDT data is determined by UE implementation. The value of the second timer is included in the logged MDT configuration information, or is not configured, but a pre-defined value is applied.

If the UE is switched again to the connected mode, the UE reports that the UE has the collected information (MDT data) stored by itself to the base station (1d-85). In this case, the base station requests the UE to report the MDT data stored by the UE by using a specific RRC message (1d-90). In response to this, the UE includes the stored MDT data in the specific RRC message, and reports the message to the base station (1d-95).

Figure 5:
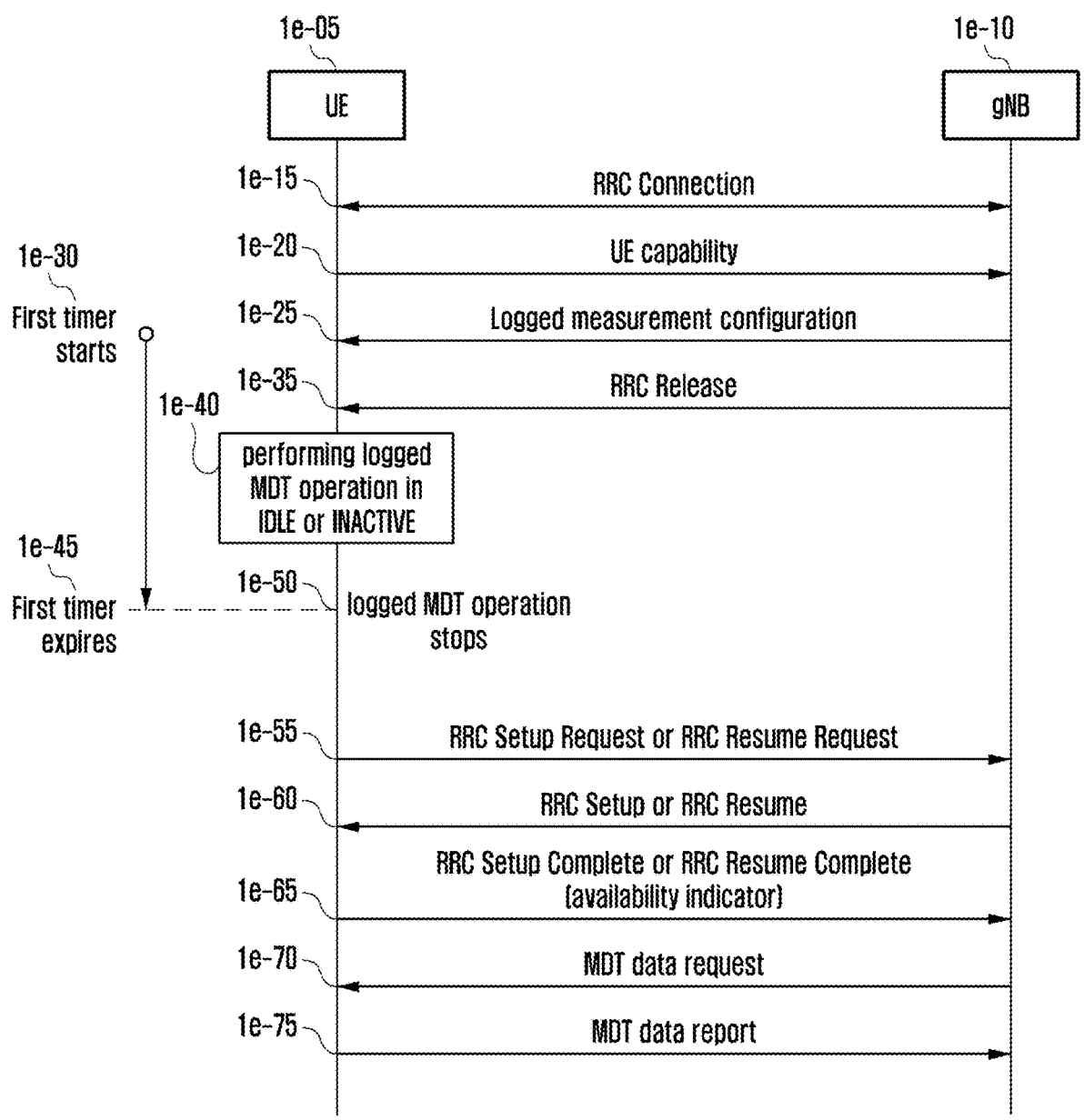
FIG. 5 is a flowchart of an operation of collecting and reporting cell measurement information according to an embodiment of the disclosure.

FIG. 5 is a flowchart of an operation of collecting and reporting cell measurement information in the disclosure.

A UE 1e-05 establishes connection with a base station 1e-10 (1e-15). The UE may provide UE capability information to the base station (1e-20), and may indicate whether the base station supports the MDT operation and what frequency the base station can measure. The base station includes configuration information necessary to perform the logged MDT operation in a specific RRC message, and transmits the RRC message to the UE (1e-25). As an example, the configuration information includes at least one of the following information.

Trace reference information
Trace recording session reference information
Trace collection entity (TCE) ID information: The base station transmits the MDT data information reported from the UE to a data server designated by the TCE ID.
Absolute time information: Absolute time in the current cell that provides the logged MDT configuration information
Area configuration: This is area information capable of collecting and storing measurement information through the logged MDT operation, and is indicated in the unit of a cell. Further, this may include RAT information for collecting the measurement information. A list included in the RAT information may be a black list or a white list. In case of the black list, cell measurement information is collected for the RAT that is not included in the list. In case of the white list, the cell measurement information is not collected for the RAT that is not included in the list.

Logging duration: This is a value of the first timer, and when the timer is being driven, the logged MDT operation is performed in the idle mode or the inactive mode.

Logging interval: This is an interval for storing the collected information.

MDT PLMN list (i.e., plmn-IdentityList): This is PLMN list information, and includes PLMN information for not only performing the logged MDT operation but also reporting whether to store the MDT data and the MDT data.

Indicator indicating whether to perform the logged MDT operation in the idle mode, in the inactive mode, or in both modes. The indicator may indicate the RRC state for performing the logged MDT operation, or may be defined that the logged MDT operation is performed always in the idle mode and the inactive mode without the indicator. The UE performs the logged MDT operation only in the RRC state indicated by the indicator.

Indicator indicating whether to collect and store beam level measurement information. In the next generation mobile communication system, a beam antenna may be applied. With respect to the frequency for performing a beam-based operation without the indicator, it may be defined that beam level measurement is always collected and stored.

Information on the maximum number of beams being collected and stored, and information on the minimum signal strength of the beam being stored. The UE may omit the storage of information of the beam that is weaker than the minimum signal strength. If all beams are weaker than the configured minimum signal value, the UE may store one of beam information having the strongest signal strength among them, or may include an indicator indicating that all beams are weaker than the configured minimum signal value therein.

Indicator indicating whether to be able to trigger an MDT retrieval operation in a second-step RRC resume process.

The UE having received the logged MDT configuration information drives a first timer (1e-30). The value of the first timer is configured to be the same as the value of the logging duration. The base station switches the UE to the idle mode or the inactive mode by using the RRC release message (1e-35). Depending on what RRC state the UE is switched to, the RRC release message includes configuration information for an operation in the RRC state. If the first timer is being driven, the UE performs the logged MDT in the idle mode or the inactive mode (1e-40). For example, the UE measures the signal strength of the serving cell and neighboring cells, and obtains location information. Further, if the beam level measurement is configured, the UE collects and stores a signal strength value for the beam that is larger than the configured minimum value in the serving cell and the neighboring cells. Here, the maximum number of beams that can be stored is configured, or is predefined. The signal strength means a reference signal received power (RSRP), a reference signal received quality (RSRQ), or a signal to interference plus noise ratio (SINR). The UE stores the collected information for each logged interval period. Thereafter, if the first timer expires (1e-45), the UE stops the logged MDT operation (1e-50).

In case that the UE is in the idle mode or the inactive mode by the RRC release message, and receives RAN or CN paging from the base station, or MO data transmission is activated, the UE initializes an establishment process or a resume process for switchover from the idle mode or the inactive mode to the connected mode.

The establishment process or the resume process may be composed of the following operations.

Step 1: The UE transmits an RRC setup request message or an RRC resume request message to the base station (1e-55).

Step 2: The base station transmits an RRC setup message or an RRC resume message to the UE (1e-60).

Step 3: The UE transmits an RRC setup complete message or an RRC resume complete message to the base station (1e-65).

The UE includes an indicator indicating whether MDT data stored by the UE itself exists in the RRC setup complete message or the RRC resume complete message. If necessary, the base station having received the RRC setup complete message requests the MDT data report by using a specific RRC message, for example, UEInformationRequest (1e-70). The UE having received the request reports the MDT data by using a specific RRC message, for example, UEInformationResponse (1e-75).

In the disclosure, a general handover operation is so featured that the UE immediately performs the handover operation in case that the UE receives the configuration information indicating performing of the handover from the base station. In contrast, a condition-based handover operation is so featured that in case that the UE receives the configuration information indicating the performing of the handover from the base station, the UE does not immediately perform the handover operation, but performs the handover operation when a predetermined condition is satisfied. Due to such a feature, the condition-based handover operation is called a conditional handover (CHO). Since the UE can grasp the change of the channel quality state most quickly, it is advantageous in minimizing a handover failure probability that the UE determines a starting time of the handover operation. Accordingly, as compared with the general handover, the condition-based handover is considered as a more advanced technology. The general handover may consider only one target cell, whereas the condition-based handover may consider one or more target cells. The network determines the number of target cells being considered in the condition-based handover.

Figure 6:
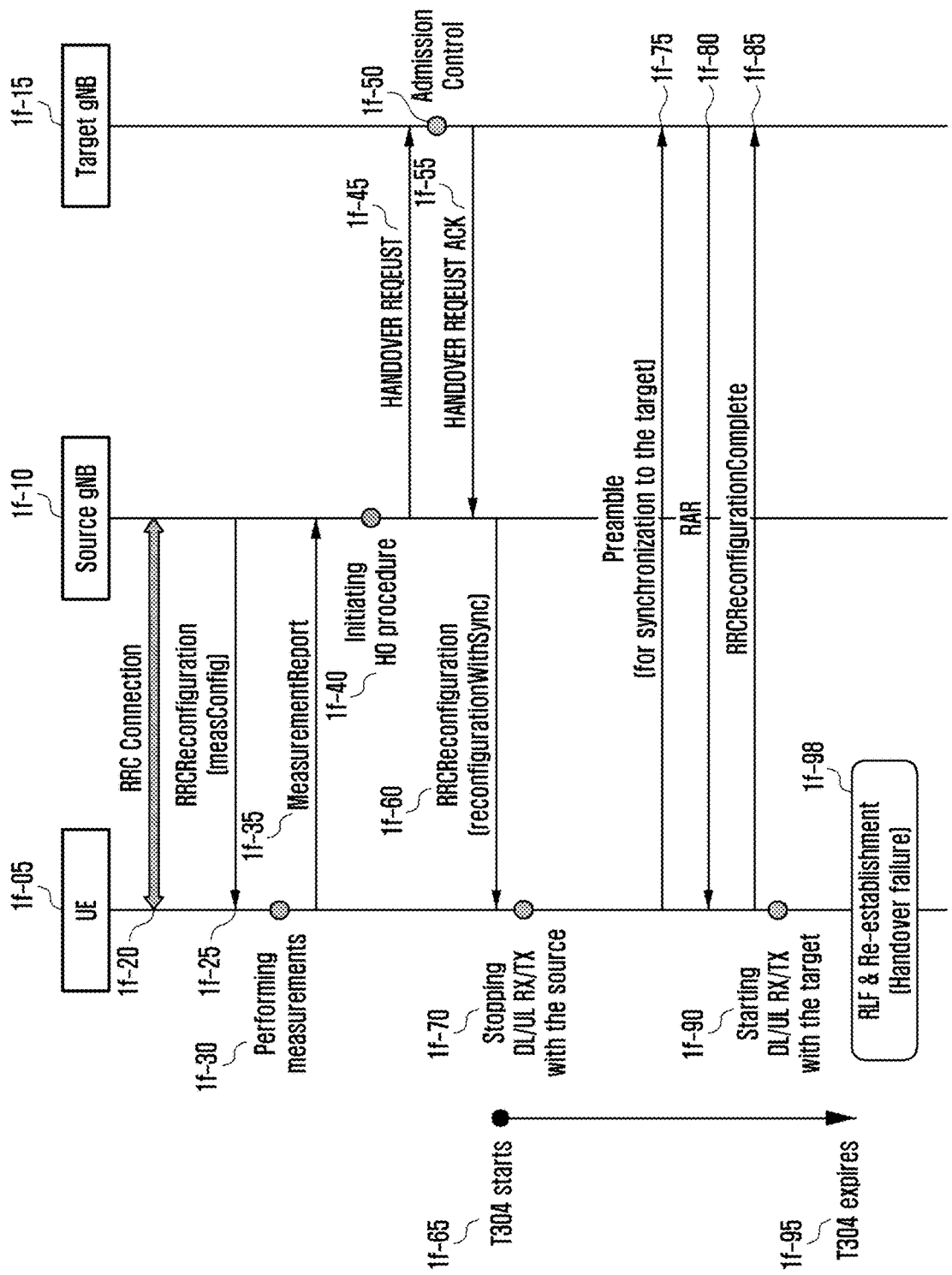
FIG. 6 is a flowchart of a general handover operation according to an embodiment of the disclosure.

FIG. 6 is a flowchart of a general handover operation according to an embodiment of the disclosure.

A UE 1f-05 performs data transmission/reception operation in a connected mode state with a source cell 1f-10 (1f-20). The UE receives a specific RRC message including measurement configuration information from the source cell (1f-25).

The UE measures signal qualities of a serving cell and neighboring cells by applying the measurement configuration information (1f-30), and reports the collected cell measurement information to the source cell periodically or when a configured event occurs (1f-35).

The source cell determines whether to trigger a general handover operation based on the reported cell measurement information (1f-40). For example, in case that event A3 (neighbor becomes offset better than SpCell) is satisfied, and thus the cell measurement information is reported, the source cell may determine the general handover. If it is determined to trigger the general handover, the source cell requests the general handover from one target cell 1f-15 through a specific inter-node message (1f-45). The target cell having received the request accepts this by using a specific admission control (1f-50), and transmits handover configuration information necessary for the general handover operation to the source cell (1f-55). The source cell includes the handover configuration information received from the target cell and additional configuration information in a specific RRC message, and transmits the RRC message to the UE (1f-60). The configuration information includes a target cell ID, frequency information, configuration information necessary for a random access operation to the target cell (dedicated preamble information and dedicated radio resource information), transmission power information, and C-RNTI information used in the target cell.

The UE having received the handover configuration information immediately performs the random access process to the target cell, and drives a timer T304 (1f-65). Further, the UE stops the data transmission/reception operation with the source cell (1f-70). Further, the UE transmits the provided preamble (1f-75). If the dedicated preamble is not provided, the UE transmits one of preambles being used based on competition. The target cell having received the preamble transmits a random access response (RAR) message to the UE (1f-85). The UE transmits msg 3 to the target cell by using UL grant information included in the RAR (1f-85). The msg 3 includes an RRCReconfigurationComplete message. If the random access process is successfully completed, the UE considers that the general handover has been successfully completed, and stops the timer T304 being driven. Further, the UE perform the data transmission/reception operation with the target cell (1f-90). If the general handover has not been successfully completed until the timer T304 expires (1f-95), the UE considers that the handover has failed. In this case, the UE declares the RLF, and performs a reestablishment operation (1f-98). When declaring the RLF, the UE records useful information that can be collected at that time, and may report the same as an RLF reports when being connected to one cell later.

Figure 7:
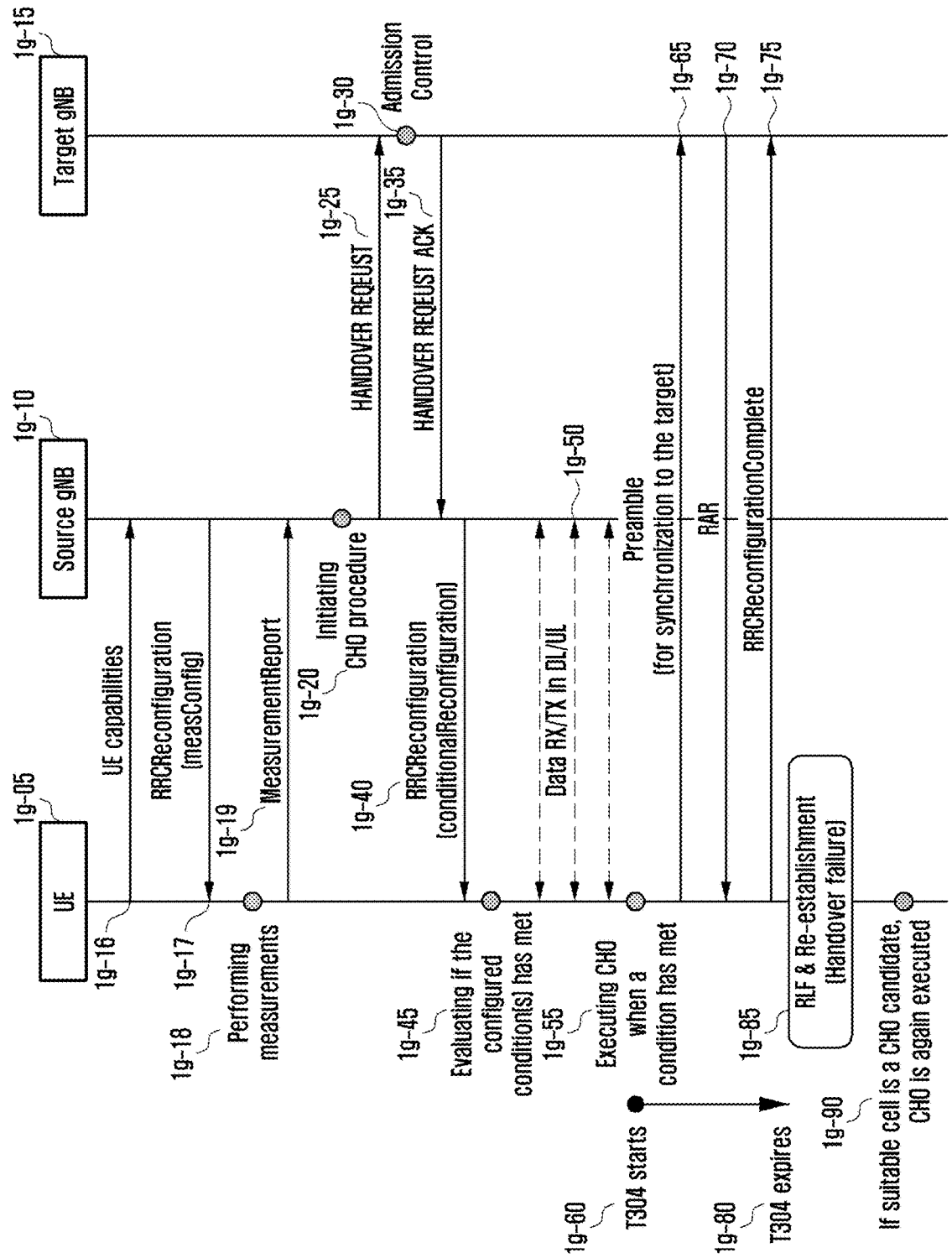
FIG. 7 is a flowchart of a condition-based handover operation according to an embodiment of the disclosure.

FIG. 7 is a flowchart of a condition-based handover operation according to an embodiment of the disclosure.

A UE 1g-05 reports its own capability information to a source cell 1g-10 (1g-16). The capability information indicates whether the UE supports a condition-based handover. The UE receives a specific RRC message including measurement configuration information from the source cell (1g-17). The UE measures signal qualities of a serving cell and neighboring cells by applying the measurement configuration information (1g-18), and reports the collected cell measurement information to the source cell periodically or when a configured event occurs (1g-19).

The source cell determines whether to trigger a condition-based handover operation based on the reported cell measurement information (1g-20). In order to configure the condition-based handover, it is required for the UE to support the condition-based handover.

If it is determined to trigger the condition-based handover, the source cell requests the condition-based handover from one or more target cells 1g-15 through a specific inter-node message (1g-25). The target cells having received the request accept this through a specific admission control (1g-30), and transmit handover configuration information necessary for the condition-based handover operation to the source cell (1g-35). Target cells having not accepted the request are excluded from the condition-based handover.

The source cell includes the handover configuration information received from the target cells and additional configuration information in a specific RRC message, and transmits the RRC message to the UE (1g-40). The configuration information includes IDs of target cells, frequency information, configuration information necessary for a random access operation to the target cells (dedicated preamble information and dedicated radio resource information for each target cell), transmission power information, C-RNTI information used in each target cell, and conditions for triggering the random access operation to the respective target cells.

Here, the respective conditions may differ by target cells, and a plurality of conditions may be configured with respect to one target cell. In case that a suitable cell found through the first cell selection operation is one of candidate target cells of the condition-based handover after a handover failure, an attemptCondReconfig field included in the configuration information is an indicator indicating whether to perform the condition-based handover to the cell.

The UE having received the handover configuration information evaluates whether the provided condition(s) is satisfied (1g-45). Until the condition is satisfied, the UE keeps a data transmission/reception operation with the source cell (1g-50). If a condition related to a specific target cell is satisfied (1g-55), the UE performs a random access process to the target cell, and drives a timer T304 (1g-60). For example, in case that event A3 (neighbor becomes offset better than SpCell) has been configured as the condition, and has been satisfied, the UE transmits the provided preamble to the related target cell (1g-65). In case that the dedicated preamble is not provided, the UE transmits one of the preambles being used based on the competition. The target cell having received the preamble transmits a random access response (RAR) message to the UE (1g-70). The UE transmits the msg 3 to the target cell by using UL grant information included in the RAR (1g-75). The msg 3 includes an RRCReconfigurationComplete message.

In case that the random access process is successfully completed, the UE considers that the condition-based handover has been successfully completed, and stops the timer T304 being driven. In case that the condition-based handover has not been successfully completed until the timer T304 expires (1g-80), the UE considers that the handover has failed. In this case, the UE declares the RLF, and performs a reestablishment operation (1g-85). In the reestablishment operation, in case that a suitable cell found through the cell selection operation is one of candidate target cells of the condition-based handover, the UE may perform the handover again to the cell (1g-90).

In case that the handover has been successfully completed, the UE deletes the handover configuration information. In response to the handover success reported from the target cell, the source cell deletes context information of the UE. Whether to succeed in the handover can be judged even by a UE context release message that is an inter-node message being transmitted from a target cell to a source cell. Further, the source cell instructs other candidate target cells included in the handover configuration information to delete the handover configuration information (or UE context information) (or notifies the candidate target cells that the handover configuration information is not effective anymore). The candidate target cells themselves may delete the handover configuration information, when a specific time elapses after receiving the handover request, even without the instructions of the source cell.

The disclosure proposes a method for recording and reporting specific information through an RLF report or a logged MDT.

Figure 8:
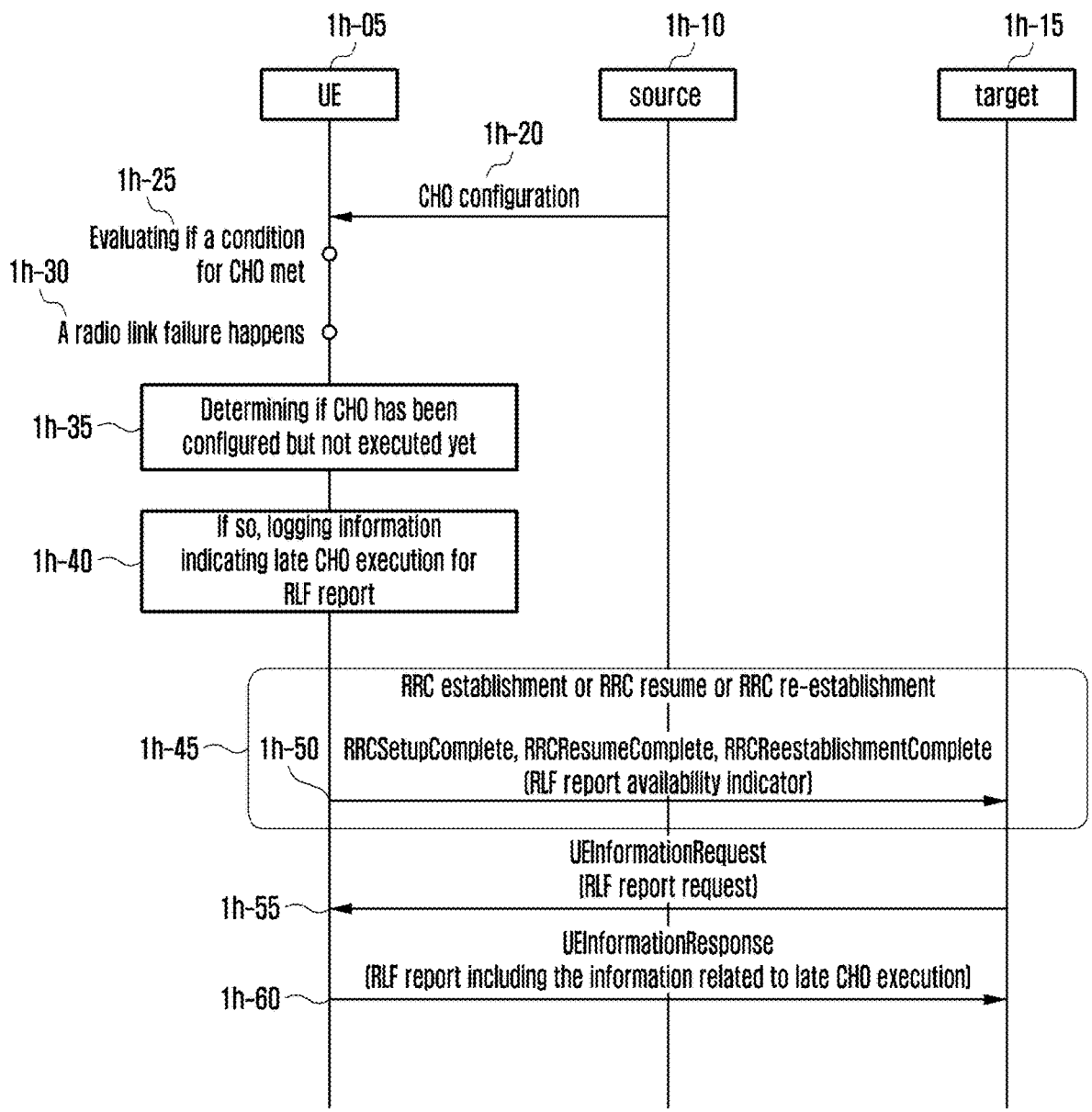
FIG. 8 is a flowchart of an operation of recording an indicator indicating a late CHO execution situation according to an embodiment of the disclosure.

FIG. 8 is a flowchart of an operation of recording an indicator indicating a late CHO execution situation according to an embodiment of the disclosure.

In the disclosure, last CHO execution scenarios are defined as follows.

Late CHO execution: In case that an RLF occurs while the UE having received the condition-based handover configuration information from the base station evaluates whether the configured condition is satisfied based on the configuration information That is, when the RLF occurs in a state where the UE is unable to execute the handover at an optimum time due to an inappropriate condition configured by the base station, this is called the last CHO execution. With the above definition, additional conditions may be added. For example, in case that a suitable cell found after the UE declares the RLF, while satisfying the definition, is one of candidate target cells indicated in the condition-based handover configuration information, this may be considered as the last CHO execution. When the last CHO execution occurs, it is necessary for a mobile communication service provider to recognize this. The mobile communication service provider having recognized the scenario may properly adjust condition parameters being applied to the condition-based handover. The present embodiment is featured so that in case the last CHO execution occurs, an indicator indicating this is included in the RLF report, and is reported to the base station.

A UE 1h-05 receives configuration information on a condition-based handover from a source base station 1h-10 (1h-20). The UE having received this evaluates whether the configured condition is satisfied (1h-25). Before the condition is satisfied, a radio link failure occurs, and the RLF is declared (1h-30). The radio link failure is determined by the UE through a radio link monitoring (RLM) operation.

In this case, as for the RLF, the UE determines whether the condition-based handover has been configured and whether the corresponding handover has not yet been executed (1h-35). If so, the UE stores an (1-bit) indicator indicating the late CHO execution in the content to be included in the RLF report (1h-40). At the time of the RLF declaration, the RLF content being stored is as in Table 1 below.

TABLE 1 connectionFailureType
This field is used to indicate whether the connection failure is due to radio link failure or handover failure.
csi-rsRLMConfigBitmap
This field is used to indicate the CSI-RS indexes that are also part of the RLM configurations.
c-RNTI
This field indicates the C-RNTI used in the PCell upon detecting radio link failure or the C-RNTI used in the source PCell upon handover failure.
failedPCellId
This field is used to indicate the PCell in which RLF is detected or the target PCell of the failed handover.
For intra-NR handover nrFailedPCellId is included and for the handover from NR to EUTRA eutraFailedPCellId is included. The UE sets the ARFCN according to the frequency band used for transmission/reception when the failure occurred.
failedPCellId-EUTRA
This field is used to indicate the PCell in which RLF is TABLE 1-continued detected or the source PCell of the failed handover in an E-UTRA RLF report.
measResultLastServCell
This field refers to the last measurement results taken in the PCell, where radio link failure or handover failure happened.
meas ResultListEUTRA
This field refers to the last measurement results taken in the neighboring EUTRA Cells, when the radio link failure or handover failure happened.
measResultListNR
This field refers to the last measurement results taken in the neighboring NR Cells, when the radio link failure or handover failure happened.
measResultServCell
This field refers to the log measurement results taken in the Serving cell.
measResult-RLF-Report-EUTRA
Includes the E-UTRA RLF-Report-r9 IE as specified in TS 36.331 [10].
noSuitableCellFound
This field is set by the UE when the T311 expires.
previousPCellId
This field is used to indicate the source PCell of the last handover (source PCell when the last RRCReconfiguration message including reconfigurationWithSync was received). For intra-NR handover nrPreviousCell is included and for the handover from EUTRA to NR eutraPreviousCell is included.
reconnectCellId
This field is used to indicate the cell in which the UE comes back to connected after connection failure and after failing to perform reestablishment. If the UE comes back to RRC CONNECTED in an NR cell then nrReconnectCellID is included and if the UE comes back to RRC CONNECTED in an LTE cell then eutraReconnectCellID is included
reestablishmentCellId
This field is used to indicate the cell in which the re-establishment attempt was made after connection failure.
rlf-Cause
This field is used to indicate the cause of the last radio link failure that was detected. In case of handover failure information reporting (i.e., the connectionFailureType is set to 'hof'), the UE is allowed to set this field to any value.
ssbRLMConfigBitmap
This field is used to indicate the SS/PBCH block indexes that are also part of the RLM configurations.
timeConnFailure
This field is used to indicate the time elapsed since the last HO initialization until connection failure. Actual value = field value * 100 ms. The maximum value 1023 means 102.3 s or longer.
timeSinceFailure
This field is used to indicate the time that elapsed since the connection (radio link or handover) failure. Value in seconds. The maximum value 172800 means 172800 s or longer.
timeUntilReconnection
This field is used to indicate the time that elapsed between the connection (radio link or handover) failure and the next time the UE comes to RRC CONNECTED in an NR or EUTRA cell. Value in seconds. The maximum value 172800 means 172800 s or longer.

Thereafter, the UE is connected to a specific base station through RRC establishment, RRC resume, and RRC reestablishment processes (1h-45). In case of storing the RLF content, the UE includes one availability indicator indicating the RLF content in an RRCSetupComplete message, an RRCResumeComplete message, and an RRCReestablishmentComplete message (1h-50). The base station requests the stored RLF content from the UE by using a UEInformationRequest message (1h-55). The UE having received the request reports the RLF content being stored by using a UEInformationResponse message (1h-60). The report of the RLF content is called an RLF report.

Figure 9:
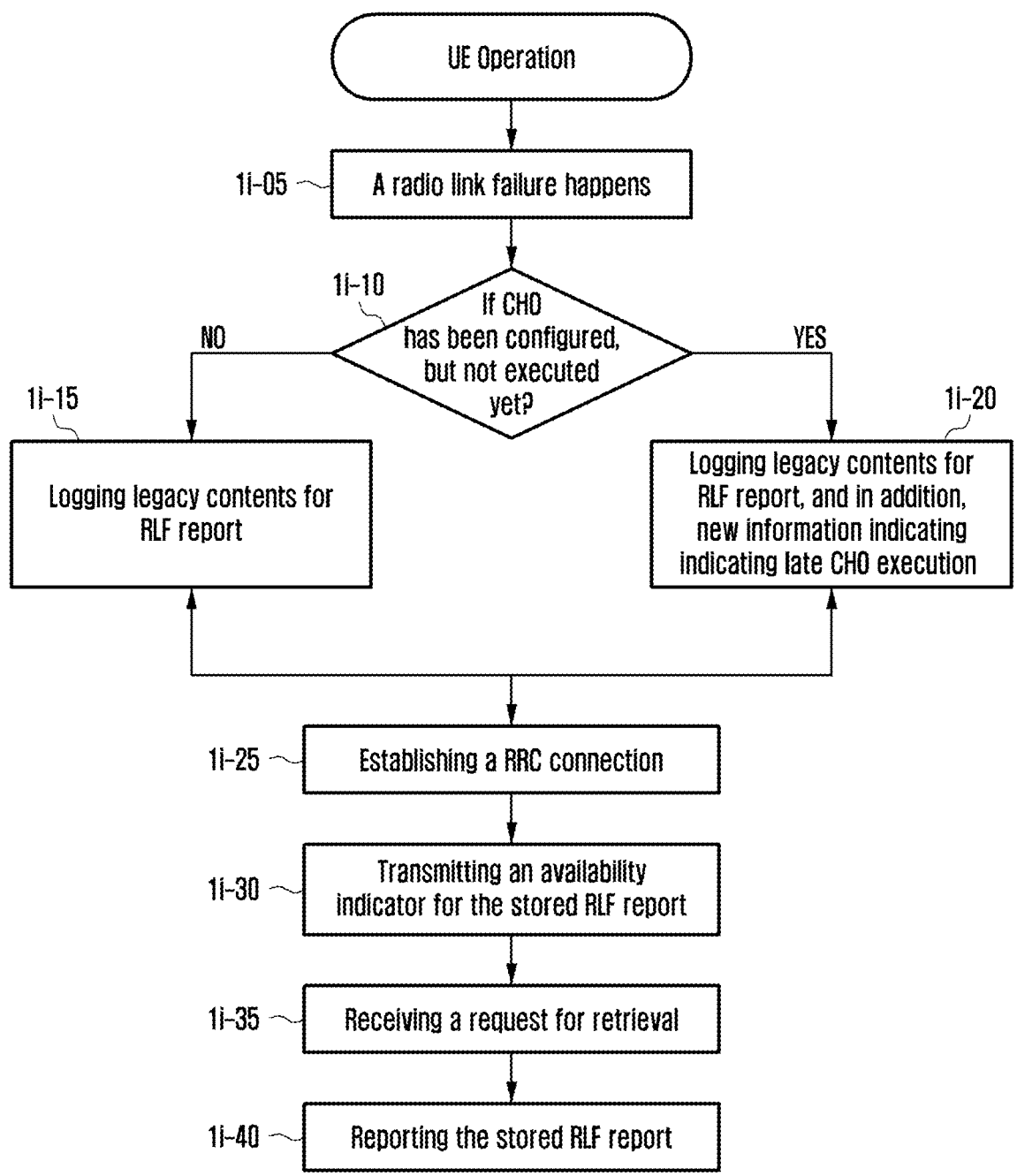
FIG. 9 is a flowchart of a UE operation of recording an indicator indicating a late CHO execution situation according to an embodiment of the disclosure.

FIG. 9 is a flowchart of a UE operation of recording an indicator indicating a late CHO execution situation according to an embodiment of the disclosure.

At step 1i-05, the UE recognizes that the radio link failure has occurred.

At step 1i-10, the UE determines whether a condition-based handover has been configured, and whether the handover has not been executed since any condition has not yet been satisfied through evaluation of whether the condition is satisfied (in other words, the UE determines whether the late CHO execution has occurred).

At step 1i-15, if the late CHO execution has not occurred, the UE stores the conventional RLF content.

At step 1i-20, if the late CHO execution has occurred, the UE stores an indicator indicating that the late CHO execution has occurred together with the conventional RLF content.

At step 1i-25, the UE is connected to one base station.

At step 1i-30, the UE reports, to the base station, an availability indicator indicating that the UE stores the RLF report.

At step 1i-35, the UE is requested by the base station to report the RLF report.

At step 1i-40, the UE reports the RLF report to the base station.

Figure 10:
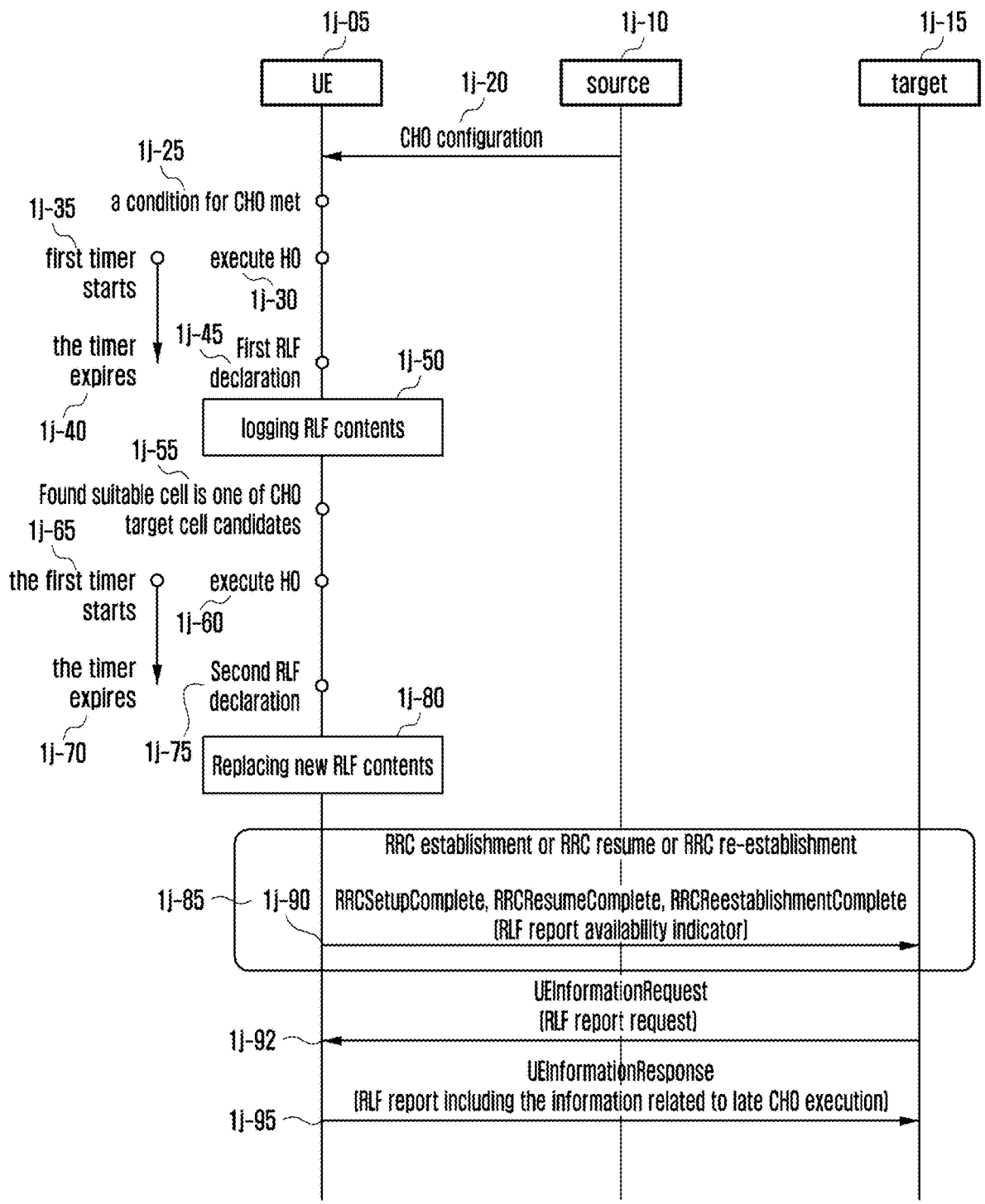
FIG. 10 is a flowchart of a conventional operation of recording RLF information in a continuous condition-based handover failure situation according to an embodiment of the disclosure.

FIG. 10 is a flowchart of a conventional operation of recording RLF information in a continuous condition-based handover failure situation according to an embodiment of the disclosure.

A UE 1j-05 receives configuration information on a condition-based handover from a source base station 1j-10 (1j-20). The configuration information includes IDs of target cells, frequency information, configuration information necessary for a random access operation to the target cells (dedicated preamble information and dedicated radio resource information for each target cell), transmission power information, C-RNTI information used in each target cell, and conditions for triggering the random access operation to the respective target cells. The respective conditions may differ by target cells, and a plurality of conditions may be configured with respect to one target cell. In case that a suitable cell found through the first cell selection operation is one of candidate target cells of the condition-based handover after a handover failure, an attemptCondReconfig field included in the configuration information is an indicator indicating whether to perform the condition-based handover to the cell.

The UE having received the handover configuration information evaluates whether the provided condition(s) is satisfied (1j-25). Until the condition is satisfied, the UE keeps a data transmission/reception operation with the source cell. If a condition related to a specific target cell is satisfied (1j-30), the UE performs a random access process to the target cell, and drives a timer T304 (1j-35). For example, in case that event A3 (neighbor becomes offset better than SpCell) has been configured as the condition, and has been satisfied, the UE transmits the provided preamble to the related target cell. In case that the dedicated preamble is not provided, the UE transmits one of the preambles being used based on the competition. The target cell having received the preamble transmits a random access response (RAR) message to the UE. The UE transmits the msg 3 (or PUSCH) to the target cell by using UL grant information included in the RAR. The msg 3 includes an RRCReconfigurationComplete message.

In case that the random access process is successfully completed, the UE considers that the condition-based handover has been successfully completed, and stops the timer T304 being driven. In case that the condition-based handover has not been successfully completed until the timer T304 expires (1j-40), the UE considers that the handover has failed. In this case, the UE declares the RLF (1j-45), and stores the above-described RLF content (1j-50).

In case that a suitable cell found through the cell selection operation is one of candidate target cells of the condition-based handover, the UE may perform the handover again to the cell (1j-55). In this case, the timer T304 is driven again (1j-65), and in case that the timer expires (1j-70), the RLF is declared again (1j-80). In this case, the existing stored RLF content is deleted, and the RLF content corresponding to the recent RLF is stored (1j-80).

Thereafter, the UE is connected to a specific base station through RRC establishment, RRC resume, and RRC reestablishment processes (1j-85). In case of storing the RLF content, the UE includes one availability indicator indicating the RLF content in an RRCSetupComplete message, an RRCResumeComplete message, and an RRCReestablishmentComplete message (1j-90). The base station requests the stored RLF content from the UE by using a UEInformationRequest message (1j-92). The UE having received the request reports the RLF content being stored by using a UEInformationResponse message (1j-95).

As shown in the conventional operation, the RLF report stored when the first RLF occurs is deleted based on the subsequent RLF occurrence. Accordingly, a mobile communication service provider is unable to accurately recognize the situation of the first RLF. The disclosure proposes a method for configuring a multiple RLF reports in case that continuous RLFs occur in the condition-based handover process. That is, when the second RLF occurs, the RLF report corresponding to the first RLF is kept as it is, or complemented/corrected without being deleted, and a predefined content is stored in the RLF report corresponding to the second RLF. In the disclosure, the RLF report corresponding to the first RLF is called a first RLF report, and the RLF report corresponding to the second RLF is called a second RLF report.

When the multiple RLF reports are configured, several options are possible.

Option 1: All predefined contents are stored in two RLF reports. However, in this case, pieces of duplicate information may be stored in the both RLF reports. Further, the existing content may not be suitable to a specific RLF report.

Option 2: The duplicate information may be stored only in one RLF report, and the remaining information may be stored in the both RLF reports.

Information related to the source cell may be the same in both the first RLF report and the second RLF report. The information corresponds to c-RNTI, failedPCellId-EUTRA, and previousPCellId.

Further, information that is not related to the handover failure, but is related only to the radio link failure less needs to be included in both the two RLF reports. The information corresponds to connectionFailureType, csi-rsRLMConfigBitmap, rlf-Cause, and ssbRLMConfigBitmap.

The above-listed information is included only in one of the two RLF reports. For example, the information may be included in the first RLF report.

In particular, it may be more suitable that specific information is included only in the second RLF report. The information corresponds to noSuitableCellFound and reconnectCellId.

Further, the following information is required to have different definitions depending on which RLF report the information is included in.

timeConnFailure information is time information until a connection failure after handover execution. In case of being included in the first RLF report, the information indicates time until the first handover failure after the first handover execution, and in case of being included in the second RLF report, the information indicates time information until the second handover failure after the second handover execution.

timeSinceFailure information is time information until an RLF report is reported after the handover failure. In case of being included in the first RLF report, the information indicates time until the RFL report is reported after the first handover execution, and in case of being included in the second RLF report, the information indicates time information until the RLF report is reported after the second handover execution. Further, in case that the second handover failure occurs with one piece of time information, the corresponding timer may restart.

timeUntilReconnection information is time information until the UE is switched again to a connected mode after the handover failure. In case of being included in the first RLF report, the information indicates time until the UE is switched again to the connected mode after the first handover execution, and in case of being included in the second RLF report, the information indicates time information until the UE is switched again to the connected mode after the second handover execution. Further, in case that the second handover failure occurs with one piece of time information, the corresponding timer may restart.

Option 3: Only simple information is stored in one RLF report, and all predefined contents are stored in the other RLF report.

For example, only specific information, such as 1-bit indicator or failedPCellId, is included in one RLF report in order to identify whether the RLF occurs only, and all predefined contents are stored in the other RLF report.

The contents corresponding to the first RLF report and the second RLF report may be stored together in a UE variable VarRLF-Report, or may be separately stored in a separate UE variable (e.g., VarRLF-REportExt) for the second RLF report.

Figure 11:
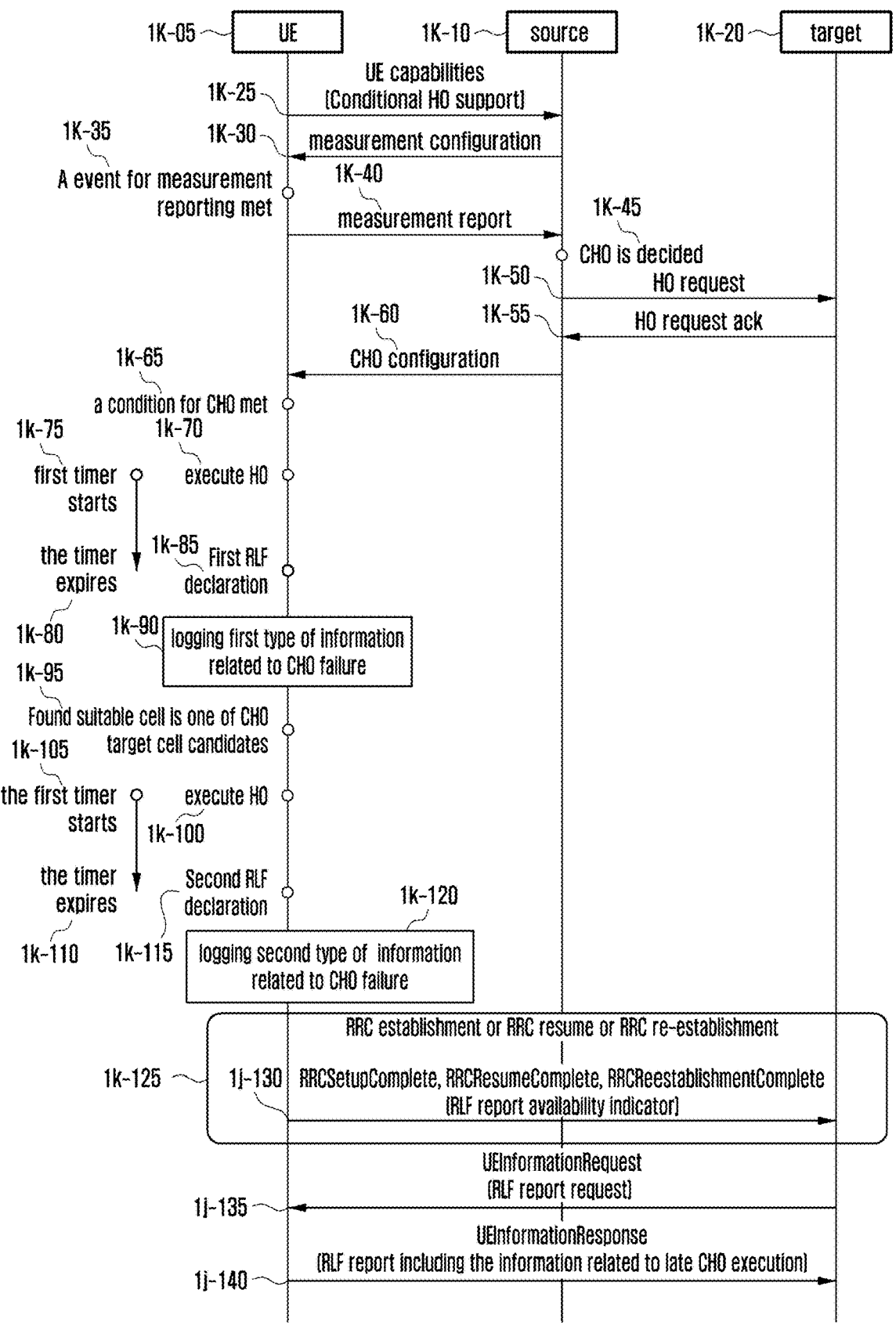
FIG. 11 is a flowchart of an operation of recording RLF information in a continuous condition-based handover failure situation according to an embodiment of the disclosure.

FIG. 11 is a flowchart of an operation of recording RLF information in a continuous condition-based handover failure situation according to an embodiment of the disclosure.

A UE 1k-05 reports its own capability information to a source cell 1k-10 (1k-25). The capability information indicates whether the UE supports a condition-based handover. Further, the capability information may indicate whether the UE has the capability of configuring multiple RLF reports in case that a continuous RLF occurs in the condition-based handover process.

The UE receives a specific RRC message including measurement configuration information from the source cell (1k-30). The UE measures signal qualities of a serving cell and neighboring cells by applying the measurement configuration information (1k-35), and reports the collected cell measurement information to the source cell periodically or when a configured event occurs (1k-40). The base station may configure whether to perform the multiple RLF report operations based on the UE capability information. Further, the UE supporting the multiple RLF report operations may always perform the multiple RLF report operations.

The source cell determines whether to trigger a condition-based handover operation based on the reported cell measurement information (1k-45). In order to configure the condition-based handover, it is required for the UE to support the condition-based handover. If it is determined to trigger the condition-based handover, the source cell requests the condition-based handover from one or more target cells 1k-20 through a specific inter-node message (1k-50). The target cells having received the request accept this by using a specific admission control, and transmit the handover configuration information necessary for the condition-based handover operation to the source cell (1k-55).

The UE receives the configuration information on the condition-based handover from a source base station (1k-60). The configuration information includes IDs of target cells, frequency information, configuration information necessary for the random access operation to the target cells (dedicated preamble information and dedicated radio resource information for each target cell), transmission power information, and C-RNTI information used in each target cell, and conditions for triggering the random access operation to the target cells. The respective conditions may differ by target cells, and a plurality of conditions may be configured with respect to one target cell. In case that a suitable cell found through the first cell selection operation is one of candidate target cells of the condition-based handover after a handover failure, an attemptCondReconfig field included in the configuration information is an indicator indicating whether to perform the condition-based handover to the cell.

The UE having received the handover configuration information evaluates whether the provided condition(s) is satisfied (1k-65). Until the condition is satisfied, the UE keeps the data transmission/reception operation with the source cell. If a condition related to a specific target cell is satisfied (1k-70), the UE performs a random access process to the target cell, and drives a timer T304 (1k-75). For example, in case that event A3 (neighbor becomes offset better than SpCell) has been configured as the condition, and has been satisfied, the UE transmits the provided preamble to the related target cell. In case that the dedicated preamble is not provided, the UE transmits one of the preambles being used based on the competition. The target cell having received the preamble transmits a random access response (RAR) message to the UE. The UE transmits the msg 3 (or PUSCH) to the target cell by using UL grant information included in the RAR. The msg 3 includes an RRCReconfigurationComplete message.

In case that the random access process is successfully completed, the UE considers that the condition-based handover has been successfully completed, and stops the timer T304 being driven. In case that the condition-based handover has not been successfully completed until the timer T304 expires (1k-80), the UE considers that the handover has failed. In this case, the UE declares the RLF (1k-85), and stores the content corresponding to the above-described first RLF report (1k-90).

In case that an attemptCondReconfig field is configured, and a suitable cell found through the cell selection operation is one of candidate target cells of the condition-based handover (1k-95), the UE may perform the handover again to the cell (1k-100). In this case, the timer T304 is again driven (1k-105), and if the timer expires (1k-110), the second RLF is declared (1k-115). In this case, the existing stored RLF content is kept as it is, or complemented/corrected, and the RLF content corresponding to the second RLF is also stored (1k-120).

Thereafter, the UE is connected to a specific base station through RRC establishment, RRC resume, and RRC reestablishment processes (1k-125). In case of storing the RLF content, the UE includes one availability indicator indicating the RLF content in an RRCSetupComplete message, an RRCResumeComplete message, and an RRCReestablishmentComplete message (1k-130). The base station requests the stored RLF content from the UE by using a UEInformationRequest message (1k-135). The UE having received the request reports the RLF content being stored by using a UEInformationResponse message (1k-140).

For the first RLF report and the second RLF report, a common availability indicator, an indicator (in UEInformationRequest) for a common retrieval request, and a common RLF-Report IE (in UEInformationResponse) are utilized. Further, a separate availability indicator for the second RLF report, an indicator for a separate retrieval request, and a separate RLF-Report IE may be defined. In case of having the separate indicators and the IE, the base station has an advantage that only preferred information can be selectively reported thereto.

Figure 12:
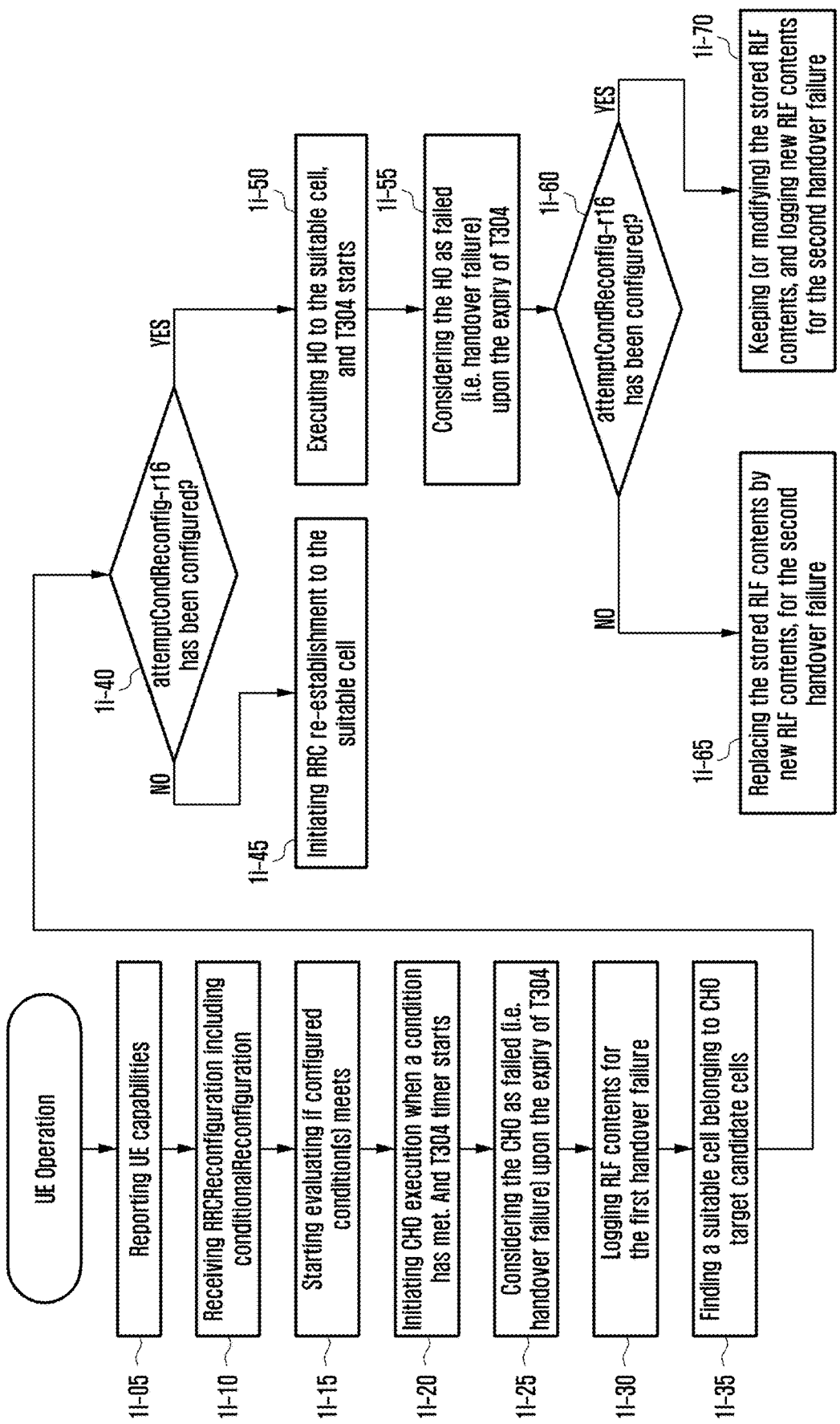
FIG. 12 is a flowchart of a UE operation of recording RLF information in a continuous condition-based handover failure situation according to an embodiment of the disclosure.

FIG. 12 is a flowchart of a UE operation of recording RLF information in a continuous condition-based handover failure situation according to an embodiment of the disclosure.

At step 1l-05, a UE reports its own capability information to a source base station. The capability information indicates whether the UE support a condition-based handover. Further, the capability information may indicate whether the UE has the capability of configuring multiple RLF reports in case that a continuous RLF occurs in the condition-based handover process.

At step 1l-10, the UE receives configuration information on the condition-based handover from the source base station.

At step 1l-15, the UE determines whether conditions indicated in the condition-based handover configuration information are satisfied.

At step 1l-20, if at least one of the conditions is satisfied, the UE performs the handover to a target cell corresponding to the condition, and drives a timer T304.

At step 1l-25, if the handover has not been successfully completed until the timer T304 being driven expires, the UE considers that the handover has failed.

At step 1l-30, the UE stores content that corresponds to a first RLF report corresponding to the failure.

At step 1l-35, the UE finds one of candidate target cells of the condition-based handover as a suitable cell.

At step 1l-40, the UE determines whether an attemptCondReconfig field has been configured. That is, the UE determines whether it is allowed to perform a handover to the suitable cell instead of a reestablishment operation.

At step 1l-45, if the field has not been configured, the UE performs an RRC reestablishment operation to the suitable cell.

At step 1l-50, if the field has been configured, the UE performs the handover to the suitable cell, and drives the timer T304.

At step 1l-55, if the handover has not been successfully completed until the timer T304 being driven expires, the UE considers that the handover has failed.

At step 1l-60, the UE determines whether to support multiple RLF report operations.

At step 1l-65, if the UE does not support the multiple RLF report operations, the UE deletes the content of the existing stored RLF report.

At step 1l-70, if the UE supports the multiple RLF report operations, the UE keeps or complements/corrects the content of the existing stored RLF report, and stores the content of the RLF report corresponding to the second handover failure. In order to optimize an amount of information in the content of the first RLF report and the second RLF report, the duplicate information may be included only on either side thereof, and unnecessary information in a specific RLF may be excluded from the content of the corresponding RLF report. Further, the definition of the included content may differ depending on a specific RLF.

If twice continuous handover failures occur in the condition-based handover, it means that the handover is unable to be performed any more, and a reestablishment operation is performed in accordance with the technology in the related art.

Figure 13:
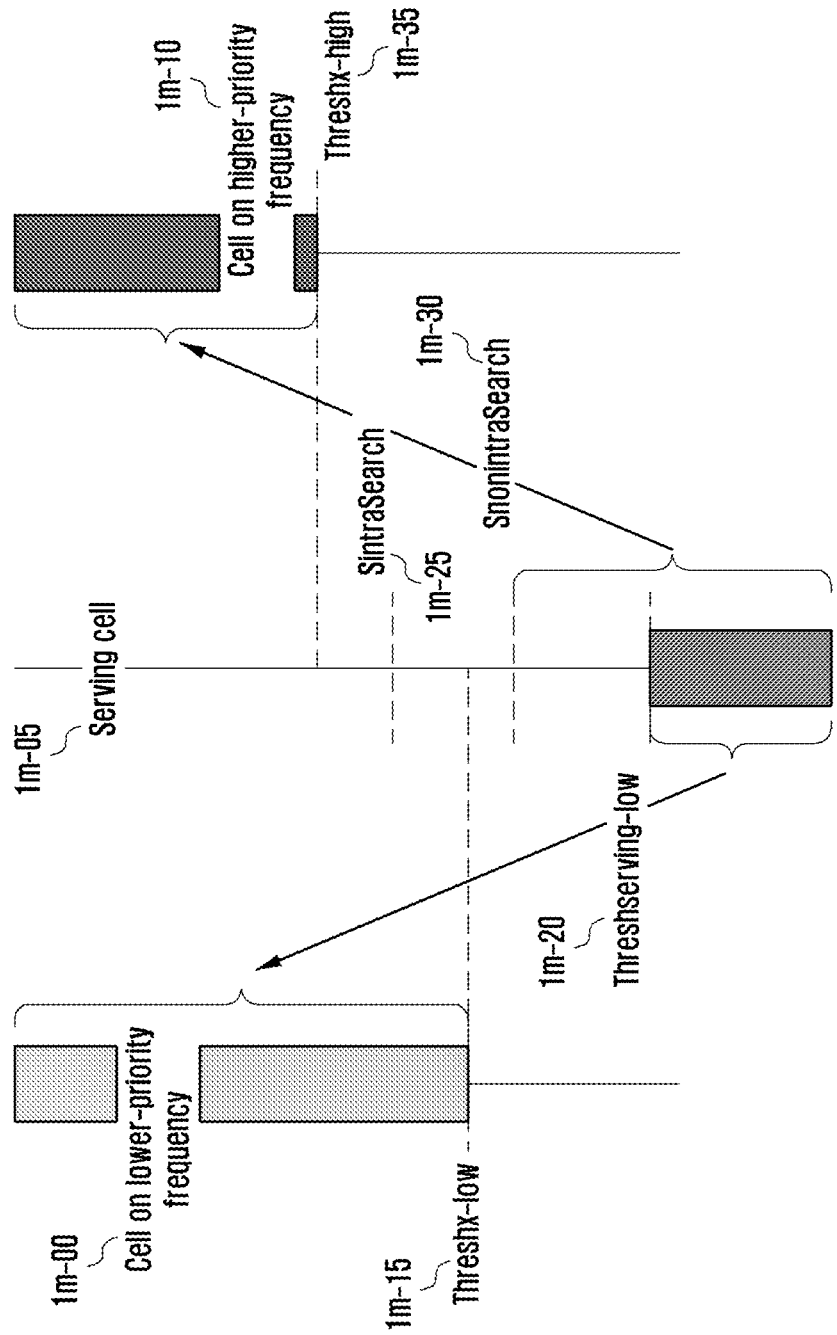
FIG. 13 is a diagram explaining a method in which a UE performs cell reselection according to the disclosure.

FIG. 13 is a diagram explaining a method in which a UE performs cell reselection according to the disclosure.

A UE always performs an inter-freq/RAT measurement on a higher-priority frequency or RAT regardless of the measurement signal strength for a serving cell. If the measurement signal strength for the serving cell is lower than SintraSearch (1m-25), the UE performs an intra-freq measurement. If the measurement signal strength for the serving cell is lower than SnonintraSearch (1m-30), the UE performs the inter-freq/RAT measurement on the frequency having a priority that is equal to or lower than the priority of the frequency of the current serving cell. As described above, the reason why the UE triggers the UE measurement step by step is to reduce the power consumption of the UE due to the neighboring cell measurement. If a channel QoS of a cell 1m-10 on a higher-priority frequency becomes higher than a specific threshold value ThreshX-high 1m-35, the UE reselects the cell on the higher-priority frequency as the serving cell. If a channel QoS of a cell 1m-00 on a lower-priority frequency is higher than a specific threshold value ThreshX-low 1m-15, and the QoS of the serving cell becomes lower than ThreshServing-low 1m-20, the UE reselects the cell on the lower-priority frequency as the serving cell.

During the cell reselection, the received signal strength (RSRP) or the received signal quality (RSRQ) may be considered. The received signal strength or the received signal quality mean values calculated through S-criteria. That is, it may be Srxlev or Squal.

$$\text{Srxlev} = Q_{rxlevmeas} - (Q_{rxlevmin} + Q_{rxlevminoffset}) - P_{compensation} - Q\text{offset}_{temp}$$

$$\text{Squal} = Q_{qualmeas} - (Q_{qualmin} + Q_{qualminoffset}) - Q\text{offset}_{temp}$$

where:

| | |
|---|---|
| Srxlev | Cell selection RX level value (dB) |
| Squal | Cell selection quality value (dB) |
| Qoffset$_{temp}$ | Offset temporarily applied to a cell as specified in [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm). If the UE supports SUL frequency for this cell, Qrxlevmin is obtained from q-RxLevMinSUL, if present, in SIB1, else Qrxlevmin is obtained from q-RxLevMin in SIB1. |
| Q$_{qualmin}$ | Minimum required quality level in the cell (dB) |
| Q$_{rxlevminoffset}$ | Offset to the signalled Q$_{rxlevmin}$ taken into account in the Srxlev evaluation as a result of a periodic search for a higher priority PLMN while camped normally in a VPLMN [9] |
| Q$_{qualminoffset}$ | Offset to the signalled Q$_{qualmin}$ taken into account in the Squal evaluation as a result of a periodic search for a higher priority PLMN while camped normally in a VPLMN [9] |
| P$_{compensation}$ | If the UE supports the additionalPmax in the NS-PmaxList, if present, in SIB1: max(P$_{EMAX1}$ − P$_{PowerClass}$, 0) − (min(P$_{EMAX2}$, P$_{PowerClass}$) − min(P$_{EMAX1}$, P$_{PowerClass}$)) (dB); else: max (P$_{EMAX1}$ − P$_{PowerClass}$, 0) (dB) |

In particular, in case of the inter-RAT cell reselection to an NR, Srxlev is used, and the Srxlev value is compared with the specific threshold value ThreshX-high or ThreshX-low.

In the disclosure, an LTE base station provides a q-RxLevMinSUL value for a specific NR frequency through system information, and if the UE supports SUL, the LTE base station derives the Srxlev value by applying the q-RxLevMinSUL value as the Qrxlevmin value of the Srxlev when performing the inter-RAT cell reselection to an NR cell belonging to the NR frequency. The q-RxLevMinSUL value is provided for each NR frequency, and if NR cells belonging to a specific NR frequency support the SUL, the q-RxLevMinSUL value for the specific NR frequency is provided. With respect to the NR frequency that does not support the SUL, the q-RxLevMinSUL value is not provided. In case of using the received signal quality, that is, RSRQ, the base station separately provides Threshserving-lowQ, ThreshX-lowQ, and ThreshX-highQ to the UE through broadcasting. In case of using the received signal strength, Threshserving-lowP, ThreshX-lowP, and ThreshX-highP are used.

Figure 14:
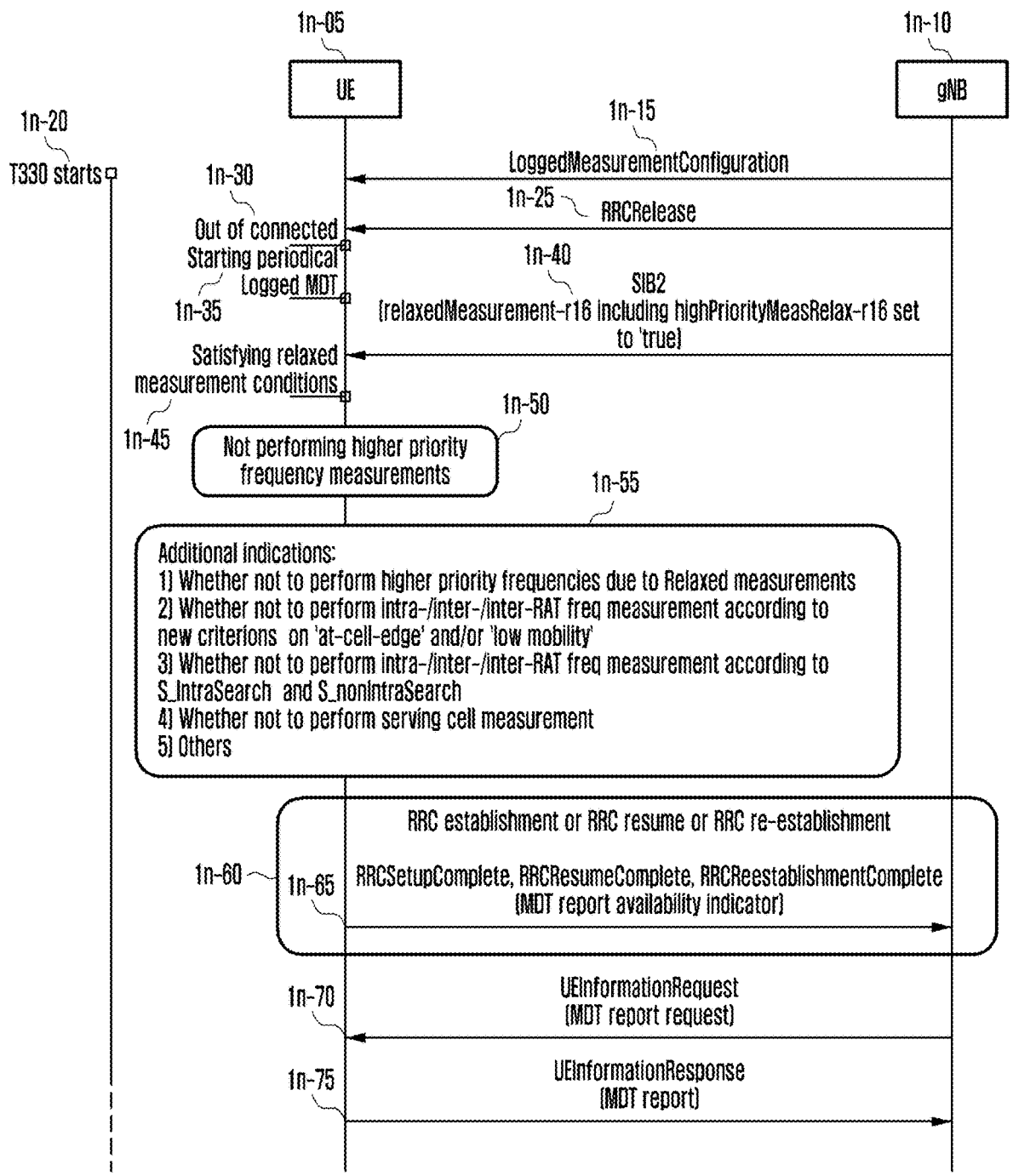
FIG. 14 is a flowchart of an operation of recording an indicator indicating that the operation has been affected by a measurement result that is recorded in accordance with a power consumption saving technology according to an embodiment of the disclosure.

FIG. 14 is a flowchart of an operation of recording an indicator indicating that the operation has been affected by a measurement result that is recorded in accordance with a power consumption saving technology according to an embodiment of the disclosure.

In general, a UE performs a cell measurement operation for mobility support. As an example, the UE in an idle mode or in an inactive mode performs intra-frequency/inter-frequency/inter-RAT frequency measurement operation by periodically including the serving cell. Such a measurement operation causes the UE power consumption, and unless the mobility technology operation, such as the cell reselection, occurs in the near future, the UE power consumption can be saved by relaxing the requirements for the measurement operation. This is called an RRM measurement relaxation technology in the next generation mobile communication system NR. The requirements mean that the measurement operation stops for a specific time or a longer measurement period is applied. Further, in order to determine that the mobility technology operation, such as the cell reselection, does not occur in the near future, two conditions in the TS38.304 standard document are considered as in Table 2 below.

a highPriorityMeasRelax field. Meanwhile, the measurement result with the relaxed requirements is stored by the UE in which the MDT operation is configured. If the influence on the measurement relaxation is not indicated, a mobile communication service provider is unable to grasp whether a cell or a frequency to be actually measured does not exist, or whether the measurement has not been performed by the influence of the other features. Accordingly, the disclosure proposes a method for indicating whether there is a cell or a frequency that has not been measured due to the influence or the configuration of the other features when the cell measurement result is stored through a logged MDT operation.

A UE 1n-05 receives a LoggedMeasurementConfiguration message including logged MDT configuration information from a base station 1n-10 (1n-15). The message may include configuration information indicating whether to store together an indicator indicating whether there is a cell or a frequency that is not measured due to the influence or the configuration of the other features when the MDT measurement result for the cell is stored.

The UE having received the message drives a timer T330 (1n-20). The UE in an idle mode or in an inactive mode performs the logged MDT operation until the timer expires. The UE receives an RRCRelease message indicating getting out of a connected mode from the base station (1n-25). The UE having received the message is switched to the idle mode or the inactive mode depending on whether suspendConfig configuration information is included in the message (1n-30).

The UE starts the logged MDT operation in accordance with the logged MDT configuration information (1n-35). The UE performs a cell and frequency measurement operation in accordance with cell measurement configuration information included in SIB 1n-40 being broadcasted by the base station. The SIB includes not only configuration parameters for the purpose of reducing the UE power consumption, such as S_IntraSearch and S_nonIntraSearch in the related art but also configuration information on the measurement relaxation. For example, the SIB includes configuration parameters related to conditions for the measurement

TABLE 2

5.2.4.9.1 Relaxed measurement criterion for UE with low mobility
The relaxed measurement criterion for UE with low mobility is fulfilled when:
- $(Srxlev_{Ref} - Srxlev) < S_{SearchDeltaP}$,
Where:
- Srxlev = current Srxlev value of the serving cell (dB).
- $Srxlev_{Ref}$ = reference Srxlev value of the serving cell (dB), set as follows:
- After selecting or reselecting a new cell, or
- If $(Srxlev - Srxlev_{Ref}) > 0$, or
- If the relaxed monitoring criterion has not been met for $T_{SearchDeltaP}$:
- The UE shall set the value of $Srxlev_{Ref}$ to the current Srxlev value of the serving cell.
5.2.4.9.2  Relaxed measurement criterion for UE not at cell edge
The relaxed measurement criterion for UE not at cell edge is fulfilled when:
- $Srxlev > S_{SearchThresholdP}$, and,
- $Squal > S_{SearchThresholdQ}$, if $S_{SearchThresholdQ}$ is configured,
Where:
- Srxlev = current Srxlev value of the serving cell (dB).
- Squal = current Squal value of the serving cell (dB).

In Rel-16 NR, the serving cell measurement should always be performed regardless of the above conditions. Further, with respect to the frequency having a higher priority than the priority of the current camp-on frequency, the measurement relaxation may be applied even on the higher-priority frequency, when the above conditions are satisfied, depending on whether the base station configures relaxation and highPriorityMeasRelax field information. The UE performs the measurement operation in accordance with the cell measurement configuration information, and determines whether the measurement relaxation conditions are satisfied (1n-45). If the highPriorityMeasRelax field is configured to true, the UE may apply the measurement relaxation even to the higher-priority frequency depending on whether the above condition is satisfied (1n-50). The UE stores the effective measurement result at each logging interval, and includes the following indicators for each log (LogMeasInfo IE) in accordance with a specific rule (1n-55).

First Indicator

This indicator is used to indicate that the priority frequency has not been measured for saving the UE power consumption in case that the highPriorityMeasRelax field having been configured to true is configured by the UE that performs the logged MDT operation, and a specific priority frequency is not measured through satisfaction of the conditions.

In addition to the above indicator, information on relaxation kinds (e.g., measurement is stopped or a long measurement period is applied) to which the above conditions are satisfied and applied, and a priority frequency information list indicated in SIB (non-measured) may be stored. Priority frequencies among frequencies configured in the SIB may be selected and indicated.

Second Indicator

This indicator is used to indicate that the frequency has not been measured for saving the UE power consumption in case that the above conditions are satisfied by the UE that performs the logged MDT operation, and an intra-frequency is not measured through satisfaction of the conditions.

In addition to the above indicator, information on relaxation kinds (e.g., measurement is stopped or a long measurement period is applied) to which the above conditions are satisfied and applied, and a (non-measured) intra-frequency information indicated in SIB may be stored.

Third Indicator

This indicator is used to indicate that the frequency has not been measured for saving the UE power consumption in case that the above conditions are satisfied by the UE that performs the logged MDT operation, and an inter-frequency/inter-RAT frequency is not measured through satisfaction of the conditions.

In addition to the above indicator, information on relaxation kinds (e.g., measurement is stopped or a long measurement period is applied) to which the above conditions are satisfied and applied, and an inter-frequency/inter-RAT frequency information list indicated in SIB (non-measured) may be stored.

In the related art, even in case that the S-Criteria derived value is larger than S_IntraSearch and S_nonIntraSearch, the intra-frequency/inter-frequency/inter-RAT frequency are not measured for saving the power consumption. Even in this case, it is possible to indicate that the intra-frequency/inter-frequency/inter-RAT frequency is not measured in accordance with the above condition through a specific indicator.

Fourth Indicator

This indicator is used to indicate that the frequency has not been measured for saving the UE power consumption in case that the S-Criteria derived value is larger than the S_IntraSearch, and thus the intra-frequency/inter-frequency/inter-RAT frequency is not measured by the UE that performs the logged MDT operation.

In addition to the above indicator, intra-frequency/inter-frequency/inter-RAT frequency information indicated in SIB (non-measured) may be stored.

Fifth Indicator

This indicator is used to indicate that the frequency has not been measured for saving the UE power consumption in case that the S-Criteria derived value is larger than the S_nonIntraSearch, and thus the inter-frequency/inter-RAT frequency is not measured by the UE that performs the logged MDT operation.

In addition to the above indicator, inter-frequency/inter-RAT frequency information indicated in SIB (non-measured) may be stored.

In the current standard technology, the serving cell should always be specified regardless of the above conditions. However, in order to save additional power consumption with respect to MDT/IoT devices that do not move at all, the serving cell measurement may be stopped, or the measurement may be performed for a long period. In this case, for each log being stored, there may not be an effective serving cell measurement result. Accordingly, it may be indicated that the serving cell has not been measured through a specific indicator.

Sixth Indicator

This indicator is used to indicate that the frequency has not been measured for saving the UE power consumption in case that a specific field is configured, the above conditions are satisfied, and thus the serving cell frequency is not measured by the UE that performs the logged MDT operation.

In addition to the above indicator, information on relaxation kinds (e.g., measurement is stopped or a long measurement period is applied) to which the above conditions are satisfied and applied, and the serving cell frequency information may be stored.

Thereafter, the UE is connected to the base station through the RRC establishment, RRC resume, and RRC re-establishment processes (1n-60). If the MDT measurement result is present, the UE includes one availability indicator indicating this in RRCSetupComplete, RRCResumeComplete, and RRCReestablishmentComplete messages (1n-65). The base station requests the stored MDT measurement result from the UE by using a UEInformationRequest message (1n-70). The requested UE reports the stored MDT measurement result by using UEInformationResponse message (1n-75).

Figure 15:
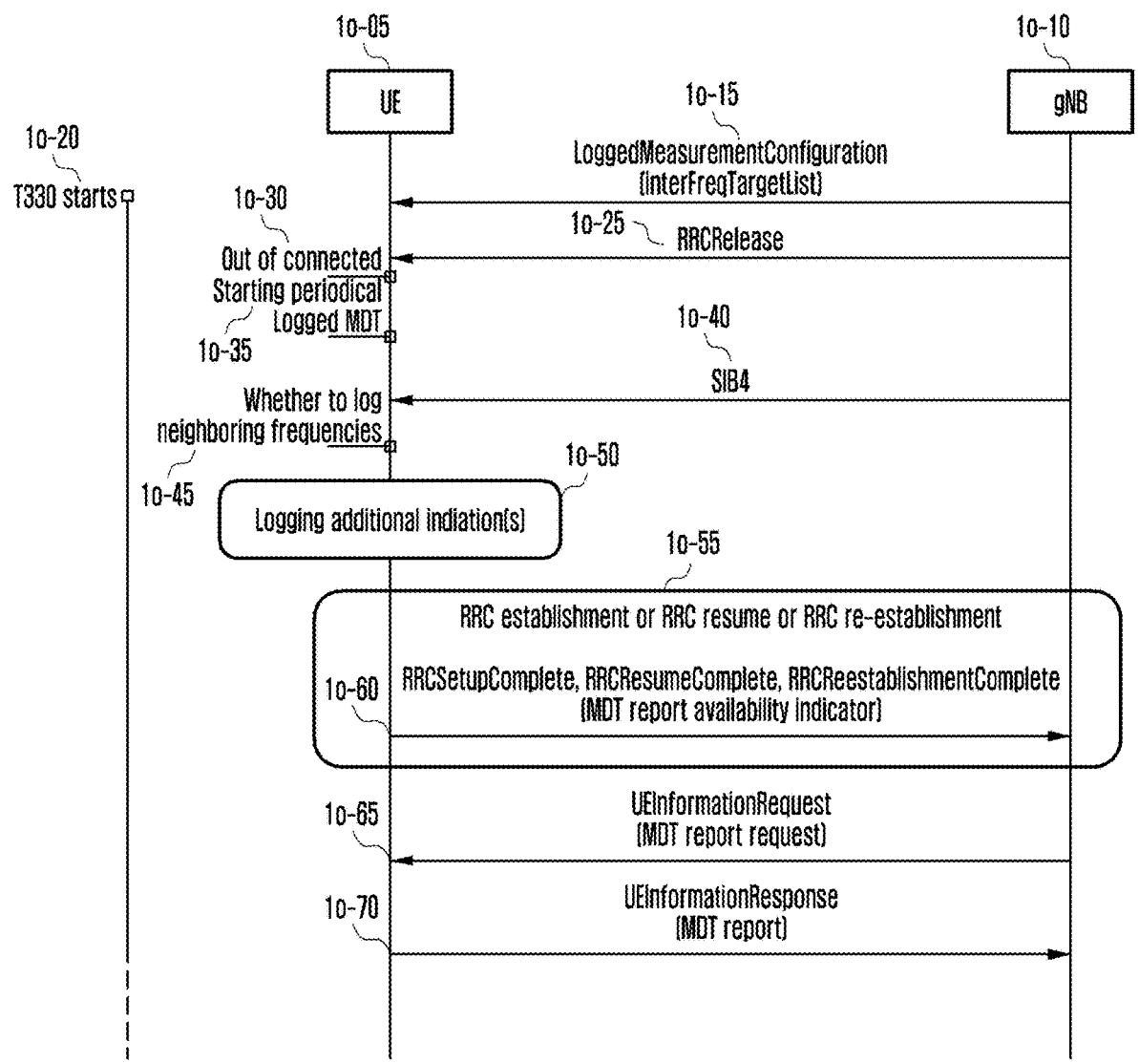
FIG. 15 is a flowchart of an operation of recording an indicator indicating that the operation has been affected by a measurement result that is recorded in accordance with configuration of interFreqTargetList according to an embodiment of the disclosure.

FIG. 15 is a flowchart of an operation of recording an indicator indicating that the operation has been affected by a measurement result that is recorded in accordance with configuration of interFreqTargetList according to an embodiment of the disclosure.

An interFreqTargetList field is information that is included in a LoggedMeasurementConfiguration message, and is used for a UE to indicate information of adjacent cells that should be stored as the MDT measurement result. If the frequency belonging to the adjacent cells is indicated in SIB4, the UE measures the frequency, and stores the measurement result. However, the frequency that does not belong to the field is not stored. This is because a mobile communication service provider efficiently manages a UE memory by measuring only the frequency of interest. The disclosure proposes a method for indicating whether there is a cell or a frequency that has not been measured by the configuration of the interFreqTargetList field, when storing the cell measurement result, through the logged MDT operation.

A UE 1o-05 receives a LoggedMeasurementConfiguration message including logged MDT configuration information from a base station 1o-10 (1o-15). The message may include configuration information indicating whether to store together an indicator indicating whether there is a cell or a frequency that is not measured by the configuration of the interFreqTargetList field when the MDT measurement result for the cell is stored.

The UE having received the message drives a timer T330 (1o-20). The UE in an idle mode or in an inactive mode performs the logged MDT operation until the timer expires. The UE receives an RRCRelease message indicating getting out of a connected mode from the base station (1o-25). The UE having received the message is switched to the idle mode or the inactive mode depending on whether suspendConfig configuration information is included in the message (1o-30). Further, the UE starts the logged MDT operation in accordance with the logged MDT configuration information (1o-35). The UE performs cell and frequency measurement operations in accordance with cell measurement configuration information included in SIB4 1o-40. For example, the UE perform the measurement operation in accordance with the cell/frequency configuration information (1o-45). The UE stores the effective measurement result at each logging interval, and includes the following indicators for each log (LogMeasInfo IE) in accordance with a specific rule (1o-50).

Seventh Indicator

This is an indicator indicating whether an interFreqTargetList field is configured.

As another method, the configured interFreqTargetList field information is included in a LogMeasReport IE to be reported to the base station.

Thereafter, the UE is connected to a specific base station through RRC establishment, RRC resume, and RRC reestablishment processes (1o-55). In case of storing the MDT measurement result, the UE includes one availability indicator indicating the MDT measurement result in an RRC-SetupComplete message, an RRCResumeComplete message, and an RRCReestablishmentComplete message (1o-60). The base station requests the stored MDT measurement result from the UE by using a UEInformationRequest message (1o-65). The UE having received the request reports the MDT measurement result being stored by using a UEInformationResponse message (1o-70).

Figure 16:
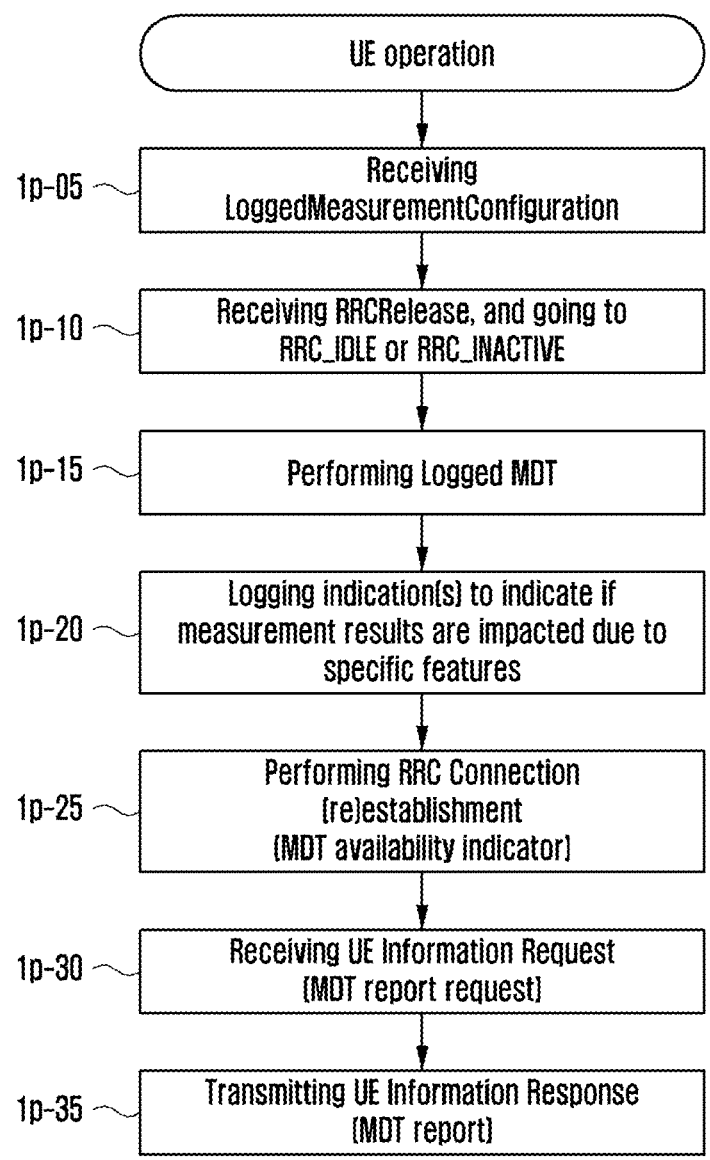
FIG. 16 is a flowchart of an operation of recording an indicator indicating that the operation has been affected by a measurement result that is recorded in accordance with a power consumption saving technology according to an embodiment of the disclosure.

FIG. 16 is a flowchart of an operation of recording an indicator indicating that the operation has been affected by a measurement result that is recorded in accordance with a power consumption saving technology according to an embodiment of the disclosure.

At step 1p-05, a UE receives a LoggedMeasurementConfiguration message from a base station.

At step 1p-10, the UE receives an RRCRelease message from the base station, and is switched to an idle mode or an inactive mode.

At step 1p-15, the UE performs a LoggedMDT operation according to configuration information received in the LoggedMeasureemntConfiguration message.

At step 1p-20, the UE stores indicators indicating that the measurement result for a specific cell or frequency has not been stored through being affected in accordance with a specific feature being performed or a specific configuration (i.e. interFreqTargetList).

At step 1p-25, the UE is switched to a connected mode through an RRC (re)establishment or RRC resume process. During the process, the UE reports an indicator indicating that there is the DMT measurement result being stored to the base station.

At step 1p-30, the UE is requested by the base station to report the MDT measurement result.

At step 1p-35, the UE reports the MDT measurement result being stored to the base station.

Figure 17:
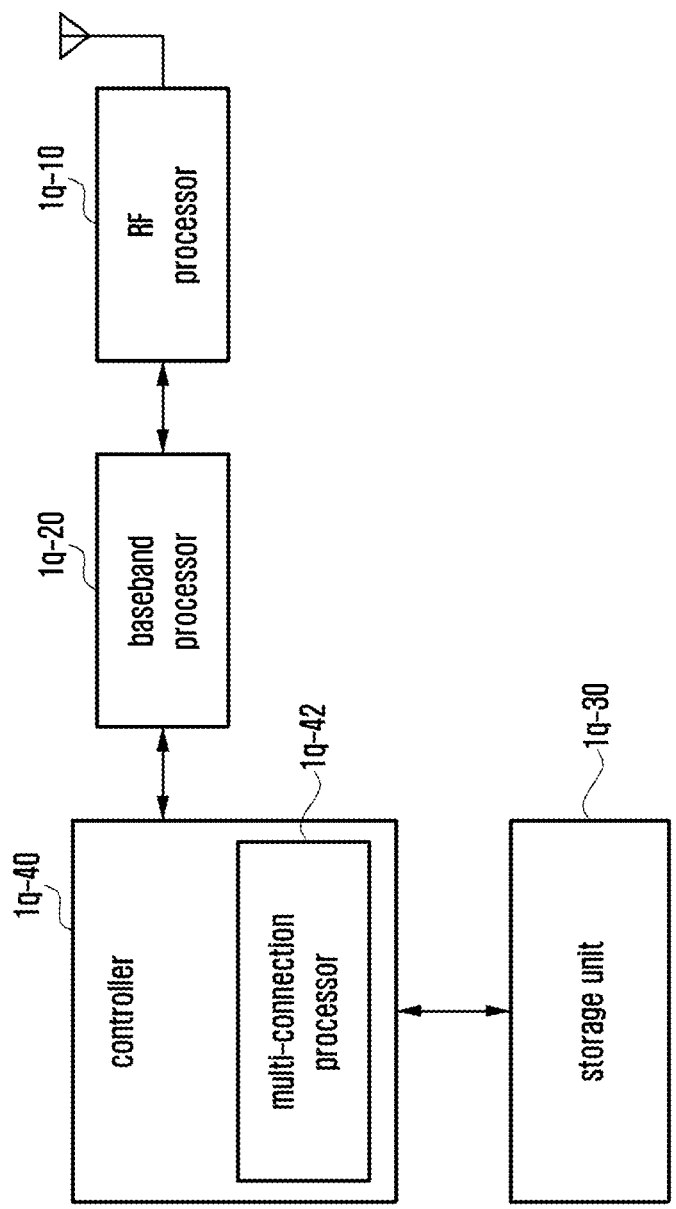
FIG. 17 is a block diagram illustrating the internal structure of a UE to which the disclosure is applied.

FIG. 17 is a block diagram illustrating the internal structure of a UE to which the disclosure is applied.

With reference to the drawing, the UE includes a radio frequency (RF) processor 1q-10, a baseband processor 1q-20, a storage unit 1q-30, and a controller 1q-40.

The RF processor 1q-10 performs a function for transmitting and receiving a signal on a radio channel, such as signal band conversion and amplification. That is, the RF processor 1q-10 performs up-conversion of a baseband signal provided from the baseband processor 1q-20 into an RF-band signal to transmit the converted signal through an antenna, and performs down-conversion of the RF-band signal received through the antenna into a baseband signal. For example, the RF processor 1q-10 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Further, the RF processor 1q-10 may include a plurality of RF chains. Further, the RF processor 1q-10 may perform beamforming. For the beamforming, the RF processor 1q-10 may adjust phases and sizes of signals transmitted or received through the plurality of antennas or antenna elements. Further, the RF processor 1q-10 may perform MIMO, and may receive several layers during performing of the MIMO operation.

The baseband processor 1q-20 performs a conversion function between a baseband signal and a bit string in accordance with the physical layer standard of the system. For example, during data transmission, the baseband processor 1q-20 generates complex symbols by encoding and modulating a transmitted bit string. Further, during data reception, the baseband processor 1q-20 restores a received bit string by demodulating and decoding the baseband signal provided from the RF processor 1q-10. For example, in case of complying with an orthogonal frequency division multiplexing (OFDM) method, during data transmission, the baseband processor 1q-20 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 1q-20 divides the baseband signal being provided from the RF processor 1q-10 in the unit of OFDM symbols, restores the signals mapped onto the subcarriers through the fast Fourier transform (FFT), and then restores the received bit string through demodulation and decoding.

The baseband processor 1q-20 and the RF processor 1q-10 transmit and receive the signals as described above. Accordingly, the baseband processor 1q-20 and the RF processor 1q-10 may be called a transmitter, a receiver, a transceiver, or a communication unit. Further, in order to support different radio access technologies, at least one of the baseband processor 1q-20 and the RF processor 1q-10 may include a plurality of communication modules. Further, in order to process signals of different frequency bands, at least one of the baseband processor 1q-20 and the RF processor 1q-10 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter (mm) wave (e.g., 60 GHz) band.

The storage unit 1q-30 stores therein a basic program for an operation of the UE, application programs, and data of configuration information. In particular, the storage unit 1q-30 may store information related to a second access node that performs wireless communication by using a second radio access technology. Further, the storage unit 1q-30 provides stored data in accordance with a request from the controller 1q-40.

The controller 1q-40 controls the overall operations of the UE. For example, the controller 1q-40 transmits and receives signals through the baseband processor 1q-20 and the RF processor 1q-10. Further, the controller 1q-40 records or reads data in or from the storage unit 1q-30. For this, the controller 1q-40 may include at least one processor. For example, the controller 1q-40 may include a communication processor (CP) that performs a control for communication and an application processor (AP) that controls an upper layer, such as an application program.

Figure 18:
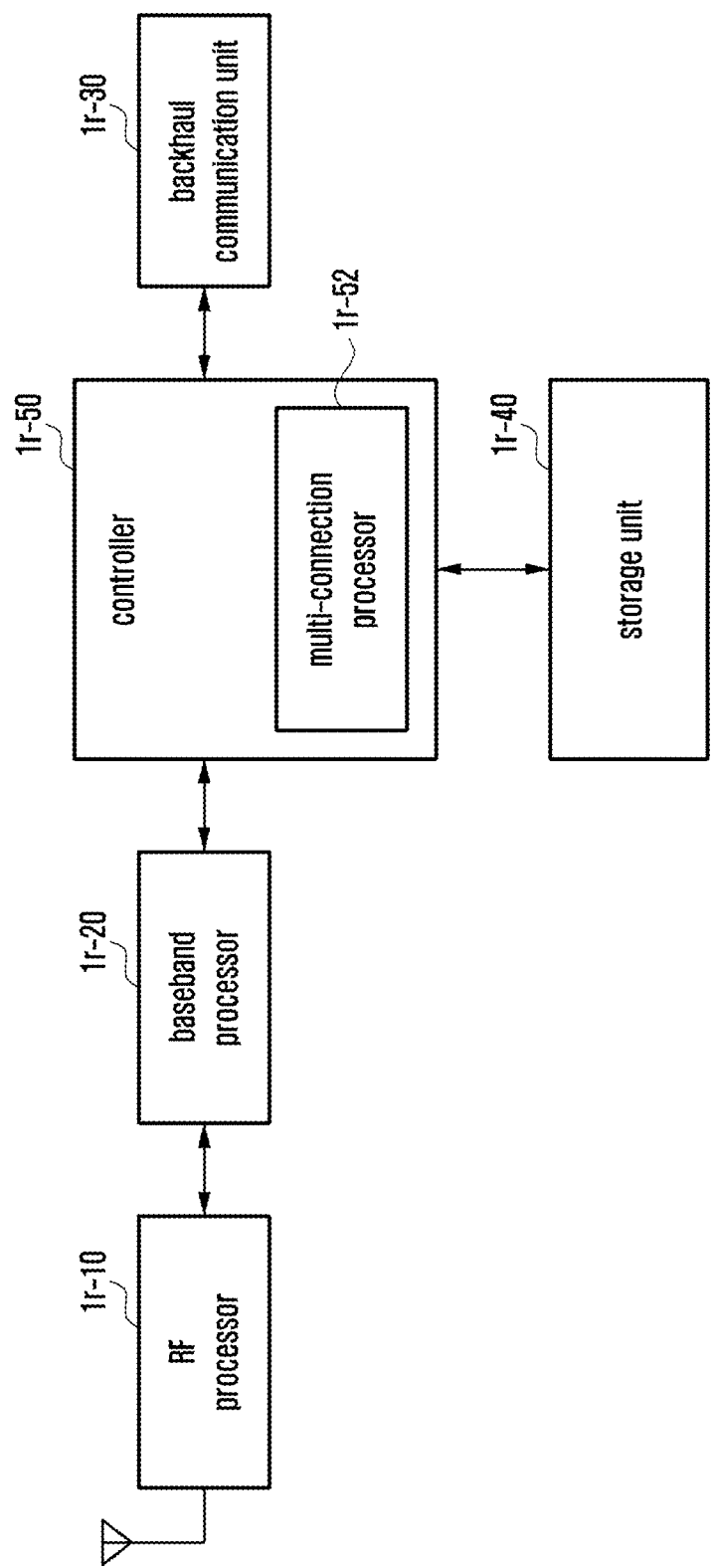
FIG. 18 is a block diagram illustrating the constitution of a base station according to the disclosure.

FIG. 18 is a block diagram illustrating the constitution of a base station according to the disclosure.

As illustrated in the drawing, the base station is configured to include an RF processor 1r-10, a baseband processor 1r-20, a backhaul communication unit 1r-30, a storage unit 1r-40, and a controller 1r-50.

The RF processor 1r-10 performs a function for transmitting and receiving signals on a radio channel, such as signal band conversion and amplification. That is, the RF processor 1r-10 performs up-conversion of a baseband signal provided from the baseband processor 1r-20 into an RF-band signal to transmit the converted signal through an antenna, and performs down-conversion of the RF-band signal received through the antenna into a baseband signal. For example, the RF processor 1r-10 may include a transmission filter, a reception filter, an amplifier, a mixer, an oscillator, a DAC, and an ADC. Although only one antenna is illustrated in the drawing, the first access node may be provided with a plurality of antennas. Further, the RF processor 1r-10 may include a plurality of RF chains. Further, the RF processor 1r-10 may perform beamforming. For the beamforming, the RF processor 1r-10 may adjust phases and sizes of signals being transmitted or received through the plurality of antennas or antenna elements. The RF processor may perform a downward MIMO operation through transmission of one or more layers.

The baseband processor 1r-20 performs a conversion function between a baseband signal and a bit string in accordance with the physical layer standard of the first radio access technology. For example, during data transmission, the baseband processor 1r-20 generates complex symbols by encoding and modulating a transmitted bit string. Further, during data reception, the baseband processor 1r-20 restores a received bit string by demodulating and decoding the baseband signal provided from the RF processor 1r-10. For example, in case of complying with an OFDM method, during data transmission, the baseband processor 1r-20 generates complex symbols by encoding and modulating a transmitted bit string, performs mapping of the complex symbols to subcarriers, and then configures OFDM symbols through the IFFT operation and CP insertion. Further, during data reception, the baseband processor 1r-20 divides the baseband signal provided from the RF processor 1r-10 in the unit of OFDM symbols, restores the signals mapped to the subcarriers through the FFT operation, and then restores the received bit string through demodulation and decoding. The baseband processor 1r-20 and the RF processor 1r-10 transmit and receive the signals as described above. Accordingly, the baseband processor 1r-20 and the RF processor 1r-10 may be called a transmitter, a receiver, a transceiver, a communication unit, or a wireless communication unit.

The backhaul communication unit 1r-30 provides an interface for performing communication with other nodes in the network. That is, the backhaul communication unit 1r-30 converts a bit string being transmitted from the primary base station to other nodes, for example, an auxiliary base station and a core network, into a physical signal, and converts the physical signal being received from other nodes into a bit string.

The storage unit 1r-40 stores therein a basic program for an operation of the main base station, application programs, and data of configuration information. In particular, the storage unit 1r-40 may store information about a bearer allocated to the connected UE and the measurement result reported from the connected UE. Further, the storage unit 1r-40 may store information that becomes the basis of determination of whether to provide or suspend a multi-connection to the UE. Further, the storage unit 1r-40 provides stored data in accordance with a request from the controller 1r-50.

The controller 1r-50 controls the overall operation of the primary base station. For example, the controller 1r-50 transmits and receives signals through the baseband processor 1r-20 and the RF processor 1r-10 or through the backhaul communication unit 1r-30. Further, the controller 1r-50 records or reads data in or from the storage unit 1r-40. For this, the controller 1r-50 may include at least one processor.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be constituted in the singular form, and although an element has been expressed in the singular form, it may be constituted in the plural form.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The invention claimed is:

1. A method performed by a terminal in a wireless communication system, the method comprising:
transmitting, to a base station, capability information indicating support of a condition-based handover;
receiving, from the base station, configuration information on the condition-based handover based on the capability information;
performing a first handover to a first cell, in case that a predetermined condition is satisfied based on the configuration information;
performing a cell selection operation based on a failure of the first handover;
performing a second handover to a second cell based on the second cell being selected by the cell selection operation; and
transmitting, to the base station, a radio link failure (RLF) report, after a radio resource control (RRC) connection with the base station is established,
wherein the RLF report includes first RLF information associated with the failure of the first handover and second RLF information associated with the failure of the second handover, wherein specific information included in the first RLF information is excluded from the second RLF information, and
wherein the specific information includes at least one of information on a source cell, information on a connection failure type, or information on an RLF cause.

2. The method of claim 1, further comprising:
storing the first RLF information based on the failure of the handover to the first cell; and
storing the second RLF information based on the failure of the handover to the second cell.

3. The method of claim 2,
wherein information on the second cell is only included in the second RLF information.

4. The method of claim 1,
wherein the second cell is included in a candidate cell list of the configuration information, and
wherein the configuration information further includes at least one of information on a cell identity (ID) for a target cell included in the candidate cell list, information on a frequency, information on a resource for performing a random access to the target cell, or information on a condition for triggering the random access.

5. A method performed by a base station in a wireless communication system, the method comprising:
receiving, from a terminal, capability information indicating support of a condition-based handover;
determining to trigger the condition-based handover for the terminal based on the capability information;
transmitting, to the terminal, configuration information on the condition-based handover; and
receiving, from the terminal, a radio link failure (RLF) report based on the configuration information, after a radio resource control (RRC) connection with the terminal is established,
wherein the RLF report includes first RLF information associated with a failure of a first handover to a first cell and second RLF information associated with a failure of a second handover to a second cell,
wherein specific information included in the first RLF information is excluded from the second RLF information, and
wherein the specific information includes at least one of information on a source cell, information on a connection failure type, or information on an RLF cause.

6. The method of claim 5,
wherein information on the second cell is only included in the second RLF information,
wherein the second cell is included in a candidate cell list of the configuration information, and
wherein the configuration information further includes at least one of information on a cell identity (ID) for a target cell included in the candidate cell list, information on a frequency, information on a resource for performing a random access to the target cell, or information on a condition for triggering the random access.

7. A terminal in a wireless communication system, the terminal comprising:
a transceiver; and
a controller configured to:
control the transceiver to transmit, to a base station, capability information indicating support of a condition-based handover,
control the transceiver to receive, from the base station, configuration information on the condition-based handover based on the capability information,
perform a first handover to a first cell, in case that a predetermined condition is satisfied based on the configuration information,
perform a cell selection operation based on a failure of the first handover,
perform a second handover to a second cell based on the second cell being selected by the cell selection operation, and
control the transceiver to transmit, to the base station, a radio link failure (RLF) report, after a radio resource control (RRC) connection with the base station is established,
wherein the RLF report includes first RLF information associated with the failure of the first handover and second RLF information associated with the failure of the second handover,
wherein specific information included in the first RLF information is excluded from the second RLF information, and
wherein the specific information includes at least one of information on a source cell, information on a connection failure type, or information on an RLF cause.

8. The terminal of claim 7,
wherein the controller is further configured to store the first RLF information based on the failure of the handover to the first cell, and store the second RLF information based on the failure of the handover to the second cell.

9. The terminal of claim 8,
wherein information on the second cell is only included in the second RLF information.

10. The terminal of claim 7,
wherein the second cell is included in a candidate cell list of the configuration information, and
wherein the configuration information further includes at least one of information on a cell identity (ID) for a target cell included in the candidate cell list, information on a frequency, information on a resource for performing a random access to the target cell, or information on a condition for triggering the random access.

11. A base station in a wireless communication system, the base station comprising:
a transceiver; and
a controller configured to:
control the transceiver to receive, from a terminal, capability information indicating support of a condition-based handover,
determine to trigger the condition-based handover for the terminal based on the capability information,
control the transceiver to transmit, to the terminal, configuration information on the condition-based handover, and
control the transceiver to receive, from the terminal, a radio link failure (RLF) report based on the configuration information, after a radio resource control (RRC) connection with the terminal is established,
wherein the RLF report includes first RLF information associated with a failure of a first handover to a first cell and second RLF information associated with a failure of a second handover to a second cell,
wherein specific information included in the first RLF information is excluded from the second RLF information, and wherein the specific information includes at least one of information on a source cell, information on a connection failure type, or information on an RLF cause.

12. The base station of claim 11,
wherein information on the second cell is only included in the second RLF information,
wherein the second cell is included in a candidate cell list of the configuration information, and
wherein the configuration information further includes at least one of information on a cell identity (ID) for a target cell included in the candidate cell list, information on a frequency, information on a resource for performing a random access to the target cell, or information on a condition for triggering the random access.

* * * * *